US006919054B2

(12) United States Patent
Gardner et al.

(10) Patent No.: US 6,919,054 B2
(45) Date of Patent: Jul. 19, 2005

(54) REACTANT NOZZLES WITHIN FLOWING REACTORS

(75) Inventors: James T. Gardner, San Jose, CA (US); Ronald J. Mosso, Fremont, CA (US); James A. Gilliam, Newman, CA (US)

(73) Assignee: NeoPhotonics Corporation, Fremont, CA (US)

( * ) Notice: Subject to any disclaimer, the term of this patent is extended or adjusted under 35 U.S.C. 154(b) by 237 days.

(21) Appl. No.: 10/119,645

(22) Filed: Apr. 10, 2002

(65) Prior Publication Data

US 2005/0042152 A1 Feb. 24, 2005

(51) Int. Cl.⁷ .............................................. B01J 19/08
(52) U.S. Cl. .................................. 422/186; 422/186.03
(58) Field of Search ............................ 422/186, 186.03

(56) References Cited

U.S. PATENT DOCUMENTS

| | | | |
|---|---|---|---|
| 3,733,060 A | 5/1973 | Merritt | 261/1 |
| 3,780,943 A | 12/1973 | Lilja | 239/8 |
| 3,806,570 A | 4/1974 | Flamenbaum et al. | 264/1.21 |
| 3,883,336 A | 5/1975 | Randall | 65/17.4 |

(Continued)

FOREIGN PATENT DOCUMENTS

| | | |
|---|---|---|
| DE | 4327081 A1 | 2/1995 |
| FR | 2 677 588 | 12/1992 |
| JP | 61-67836 | 8/1984 |
| WO | WO 86/04524 | 8/1986 |
| WO | WO 98/37165 | 8/1998 |
| WO | WO 98/37961 | 9/1998 |
| WO | WO 00/54291 | 9/2000 |
| WO | WO 01/007155 | 2/2001 |
| WO | WO 02/32588 | 4/2002 |

OTHER PUBLICATIONS

Bi et al., "Three Dimensional Engineering of Planar Optical Structures," U.S. Pat. Appl. No. 10/027,906, filed Dec. 21, 2002, 131 pages (application & drawings as filed).

Bi et al., "Nanocrystalline α–Fe, $Fe_3C$, and $Fe_7C3$ produced by $CO_2$ laser pyrolysis," J. Mater. Res., vol. 8, No. 7, pp. 1666–1674, Jul. 1993.

Bi et al., "Nanoscale carbon blacks produced by $CO_2$ laser pyrolysis," J. Mater Res., vol. 10, No. 11, pp. 2875–2884, Nov. 1995.

(Continued)

*Primary Examiner*—Rodney G. McDonald
(74) *Attorney, Agent, or Firm*—Patterson, Thuente, Skaar & Christensen; Peter S. Dardi

(57) ABSTRACT

Improved reaction chamber designs are described that provide for improved control over the flow within the reaction chamber. The reaction chambers contain reactions for particle production from a flowing reactant stream. Improved reactant delivery nozzles are described that are useful for the delivery of gas/vapor reactants and/or aerosol reactants. Improved nozzle designs can result in more uniform reactant flow. Suitable reactors can comprise an electromagnetic radiation source that projects through the reactor to drive the reaction at an electromagnetic radiation reaction zone. The improved nozzle features are suitable for reactors for particle collection and/or for coating of substrates within the reaction chamber.

63 Claims, 21 Drawing Sheets

U.S. PATENT DOCUMENTS

| | | | |
|---|---|---|---|
| 3,923,484 A | 12/1975 | Randall | 65/17.4 |
| 3,932,162 A | 1/1976 | Blankenship | 65/1.21 |
| 3,934,061 A | 1/1976 | Keck et al. | 427/163.2 |
| 4,038,370 A | 7/1977 | Tokimoto et al. | 423/376 |
| 4,065,369 A | 12/1977 | Ogawa et al. | 204/164 |
| 4,071,196 A | 1/1978 | Burke et al. | 239/492 |
| 4,113,844 A | 9/1978 | Tokimoto et al. | 423/336 |
| 4,119,509 A | 10/1978 | Szoke | 204/157.22 |
| 4,176,024 A | 11/1979 | Garbuny | 204/157.22 |
| 4,444,734 A | 4/1984 | Mastrup et al. | 423/210 |
| 4,468,474 A | 8/1984 | Gupta et al. | 502/5 |
| 4,536,252 A | 8/1985 | McDonald et al. | 438/207 |
| 4,548,798 A | 10/1985 | Rice | 423/263 |
| 4,554,291 A | 11/1985 | Gupta et al. | 518/700 |
| 4,556,416 A | 12/1985 | Kamijo et al. | 75/345 |
| 4,558,017 A | 12/1985 | Gupta et al. | 501/96.3 |
| 4,629,478 A | 12/1986 | Browner et al. | 261/78.2 |
| 4,642,227 A | 2/1987 | Flagan et al. | 423/349 |
| 4,659,681 A | 4/1987 | Rice et al. | 502/5 |
| 4,668,647 A | 5/1987 | Rice et al. | 502/5 |
| 4,678,657 A | 7/1987 | Sood et al. | 423/600 |
| 4,687,753 A | 8/1987 | Fiato et al. | 502/5 |
| 4,687,929 A | 8/1987 | Browner et al. | 250/282 |
| 4,689,129 A | 8/1987 | Knudsen | 204/157.41 |
| 4,762,995 A | 8/1988 | Browner et al. | 250/282 |
| 4,788,222 A | 11/1988 | Rice et al. | 518/700 |
| 4,842,832 A | 6/1989 | Inoue et al. | 723/21.1 |
| 4,844,736 A | 7/1989 | Shimo et al. | 75/345 |
| 4,881,722 A | 11/1989 | Koizumi et al. | 266/176 |
| 4,895,628 A | 1/1990 | Knudsen et al. | 204/157.41 |
| 4,924,097 A | 5/1990 | Browner et al. | 250/343 |
| 4,957,884 A | 9/1990 | Knudsen et al. | 501/87 |
| 4,963,289 A | 10/1990 | Ortiz et al. | 516/5 |
| 4,994,107 A | 2/1991 | Flagan et al. | 75/367 |
| 5,013,706 A | 5/1991 | Schramm et al. | 502/309 |
| 5,053,580 A | 10/1991 | Schramm et al. | 585/624 |
| 5,064,517 A | 11/1991 | Shimo | 204/157.41 |
| 5,079,033 A | 1/1992 | Schulz et al. | 427/88 |
| 5,175,433 A | 12/1992 | Browner et al. | 350/343 |
| 5,194,128 A | 3/1993 | Beaty et al. | 204/164 |
| 5,207,878 A | 5/1993 | Shimo et al. | 204/157.11 |
| 5,247,842 A | 9/1993 | Kaufman et al. | 73/865.5 |
| 5,358,695 A | 10/1994 | Helble et al. | 423/263 |
| 5,373,527 A | 12/1994 | Taniu et al. | 372/71 |
| 5,385,594 A | 1/1995 | Kanamori et al. | 65/60.2 |
| 5,447,708 A | 9/1995 | Helble et al. | 423/263 |
| 5,498,446 A | 3/1996 | Axelbaum et al. | 427/212 |
| 5,551,966 A | 9/1996 | Hirose et al. | 65/377 |
| 5,556,442 A | 9/1996 | Kanamori et al. | 65/17.4 |
| 5,589,300 A | 12/1996 | Fauteux et al. | 429/223 |
| 5,609,798 A | 3/1997 | Liu et al. | 261/78.2 |
| 5,621,561 A | 4/1997 | Belfatto et al. | 359/205 |
| 5,622,750 A | 4/1997 | Kilian et al. | 427/163.2 |
| 5,725,153 A | 3/1998 | Wang et al. | 239/102.1 |
| 5,770,126 A | 6/1998 | Singh et al. | 264/8 |
| 5,788,738 A | 8/1998 | Pirzada et al. | 25/331 |
| 5,852,768 A | 12/1998 | Jacobsen et al. | 419/63 |
| 5,863,604 A | 1/1999 | Hunt et al. | 427/248.1 |
| 5,868,322 A | 2/1999 | Loucks, Jr. et al. | 239/418 |
| 5,874,134 A | 2/1999 | Rao et al. | 427/446 |
| 5,874,684 A | 2/1999 | Parker et al. | 75/228 |
| 5,952,125 A | 9/1999 | Bi et al. | 429/231.2 |
| 5,958,348 A | 9/1999 | Bi et al. | 422/186.04 |
| 5,997,956 A | 12/1999 | Hunt et al. | 427/446 |
| 6,032,871 A | 3/2000 | Börner et al. | 239/3 |
| 6,193,936 B1 | 2/2001 | Gardner et al. | 422/186 |
| 6,254,928 B1 | 7/2001 | Doan | 427/212 |
| 6,280,802 B1 | 8/2001 | Akedo et al. | 427/561 |

OTHER PUBLICATIONS

Buerki et al., "Synthesis of Ultrafine $Si_3N_4$ Particles by $CO_2$–Laser Inducted Gas Phase Reactions," High Temperature Science, vol. 27, pp. 323–335, 1990.

Buerki et at, "Substrate–free gas–phase synthesis of diamond powder by $CO_2$ laser pyrolysis of $C_2H_4$," Surface and Coatings Technology, vol. 47, pp. 22–28, 1991.

Cannon et al., "Sinterabie Ceramic Powders from Laser–Driven Reactions: I, Process Description and Modeling," J. of the American Ceramic Society, vol. 65, No. 7, pp. 324–330, Jul. 1982.

Curcio et al., "Synthesis of ultrafine $TiO_2$ powders by a CW $CO_2$ laser," Applied Surface Science, 46:225–229, 1990.

Danen et al., "infrared laser generation of heterogeneous catalysts and laser–induced reactions at catalytic surfaces," SPIE, vol. 458, Applications of Lasers to Industrial Chemistry, pp. 124–130, 1984.

Fantoni et al., "Synthesis of ultrafine ceramic powders by means of $Co_2$ laser in a flow reactor," SPIE, vol. 1279, Laser Assisted Processing II, pp. 77–88, 1990.

Rice et al., "Material Synthesis by Laser Heating of Gasses," Spectrochimica Acta., vol. 43A, No. 2, pp. 229–300, 1987.

Flint et al., "Ceramic powders from laser driven reactions," SPIE, vol. 458, Applications of Lasers to Industrial Chemistry, pp. 108–113, 1984.

Gupta et al., "Production of light olefins from synthesis gas using catalysts prepared by laser pyrolysis," SPIE, vol. 458, Applications of Lasers to Industrial Chemistry, pp. 131–139, 1984.

Haggerty et al., "Sinterable Powders from Laser–Driven Reactions," in Laser–Induced Chemical Processes, edited by Jeffrey I. Steinfeld, pp. 165–241, 1981.

McMillen et al., "Laser–Powdered Homogeneous Pyrolysis. Thermal Studies under Homogeneous Conditions, Validation of the Technique, and Application to the Mechanism of Azo Compound Decomposition," J. Phys. Chem., 86:709–718, 1982.

Musci et al., "Laser synthesis of vanadium–titanium oxide catalysts," J. Mater. Res., vol. 7, No. 10, pp. 2846–2852, Oct. 1992.

Rice et al., "Laser synthesis of powders from large molecules," SPIE, vol. 458, Applications of Lasers to Industrial Chemistry, pp. 98–107, 1984.

Smith, "Laser pyrolysis techniques: Application to catalysis, combustion diagnostics and kinetics," SPIE., vol. 458, Applications of Lasers to Industrial Chemistry, pp. 11–16, 1984.

Woodin et al., "Analytical applications of laser powered pyrolysis," SPIE vol. 458, Applications of Lasers to Industrial Chemistry, pp. 28–34, 1984.

Andres et al., "Research opportunities on clusters and cluster–assembled materials—A Department of Energy, Council on Materials Science Panel Report," J. Mater. Res., vol. 4, No. 3, pp. 704–736, May/Jun. 1989.

Siegel et al., "Synthesis, characterization, and properties of nanophase $TiO_2$," J. Materials Research, 3:1367–1372, 1988.

Rice et al., "Laser–Driven Synthesis of Transition–Metal Carbides, Sulfides and Oxynitrides," in Laser Chemistry of Organometallics, pp. 273–278, 1993.

Cannon et al., "Sinterable Ceramic Powders from Laser–Driven Reactions: 11, Powder Characteristics and Process Variables," J. of the American Ceramic Society, vol. 65, No. 7, pp. 330–335, Jul. 1982.

Gurav et al., "Aerosol Processing of Materials", Aerosol Science and Technology, vol, 19, No. 4, pp. 411–452, 1993.

Cauchetier et al., "Nanocomposition Si/C/N Powder Production by Laser–Aerosol Interaction," Journal of the American Ceramic Society, vol. 77, No. 4, pp. 993–998, 1994.

Ogihara et al., "Preparation of Spherical LiCoO.sub.2 Fine Powders by Ultrasonic Spray (Thermal) Decomposition and its Application to Cathode Active Materials in Lithium Secondary Batteries," Journal of the Ceramic Society of Japan, vol. 101, No. 10, pp. 1159–1163, 1993. (Translation from Japanese included.).

Vollath et al., "Synthesis of Ceramic Oxide Powders by Microwave Plasma Pyrolysis," Journal of Materials Science, 28, pp. 5943–5948, 1993.

Liang et al., "Laser synthesize silicon–based and ferrobased nano powders," SPIE vol. 3862, pp. 17–21, 1999.

Barbarossa et al., "Effect of temperature gradient on sintering kinetics of doped silica waveguides by flame hydrolysis deposition," SPIE vol. 1794 Integrated Optical Circuits ll, pp. 191–197, 1992.

Lebedev et al., "Laser distillation–deposition synthesis of silica glasses with variable concentrations of oxygen deficient centers," SPIE vol. 2498, pp. 65–71, 1995.

Barbarossa et al., "High–silica cascaded three–waveguide couplers for wideband filtering by Flam Hydrolysis on Si," SPIE vol. 1583 Integrated Optical Circuits, pp. 122–128, 1991.

Barbarossa et al., "Optical damage threshold of $P_2O_5$ and $GeO_2$–$P_2O_5$–doped silica waveguides," SPIE vol. 1794 Integrated Optical Circuits II, pp. 185–190, 1992.

Barbarossa et al., "High–silica low–loss three waveguide couplers on Si by Flame Hydrolysis Deposition," SPIE vol. 1513 Glasses for Optoelectronics II, pp. 37–43, 1991.

Maxwell, "Photosensitivity & rare–earth doping in flame hydrolysis deposited planar silica waveguides," SPIE vol. 2695, pp. 16–29, 1996.

Sun et al., "Building passive components with silica waveguides," SPIE vol. 3795, pp. 313–319, 1999.

Center of Nano Particle Control; Web Site Mansoo CHOI, Associate Professor or Mechanized Engineering, Seoul National University, Jun., 2000.

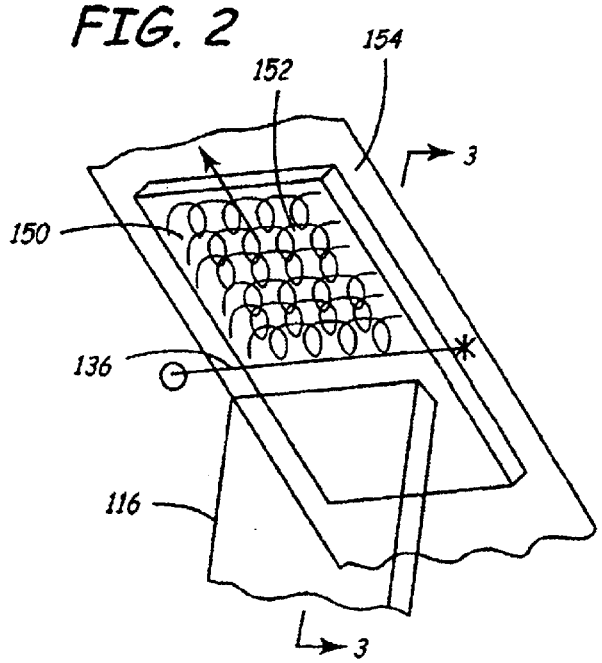
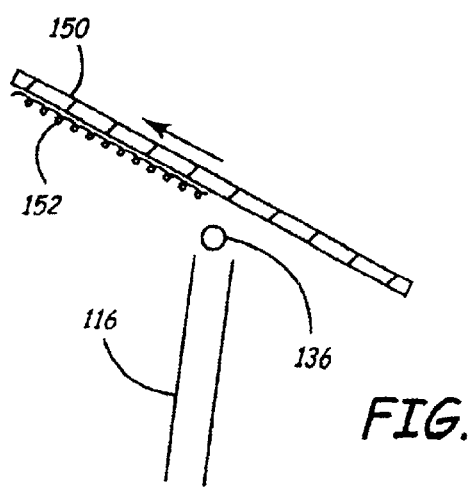
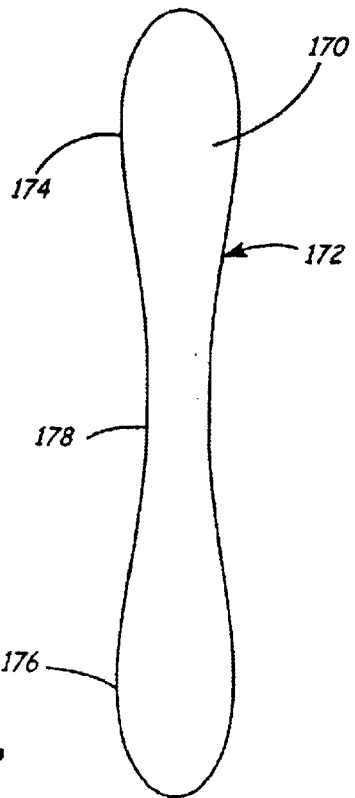

FIG. 14
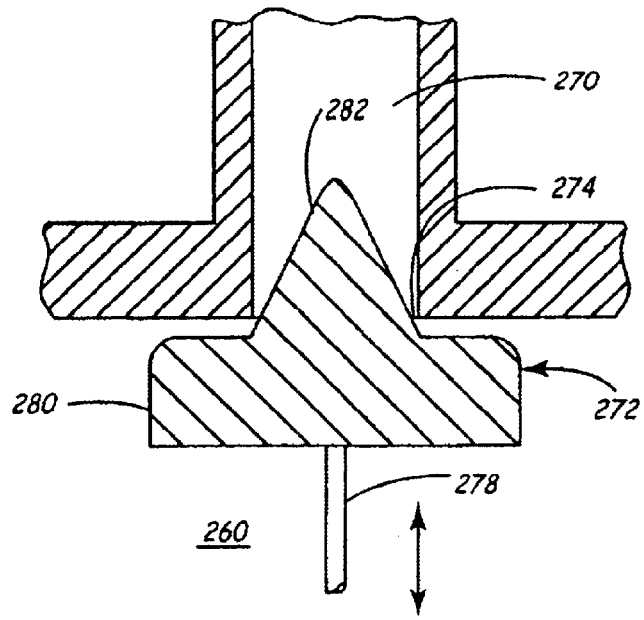
FIG. 15
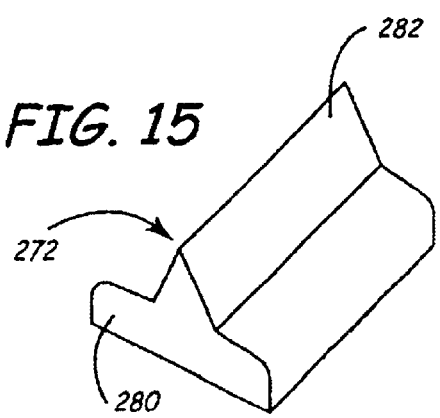
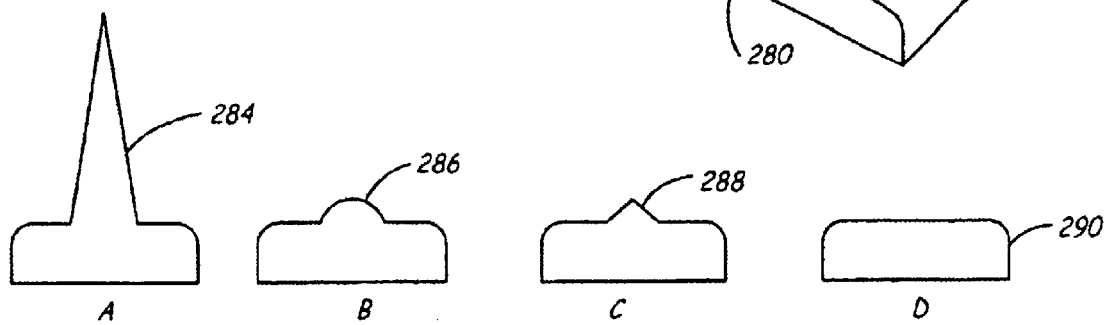
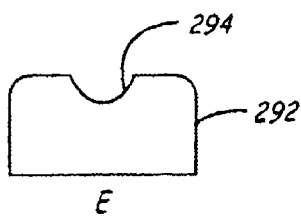
FIG. 16

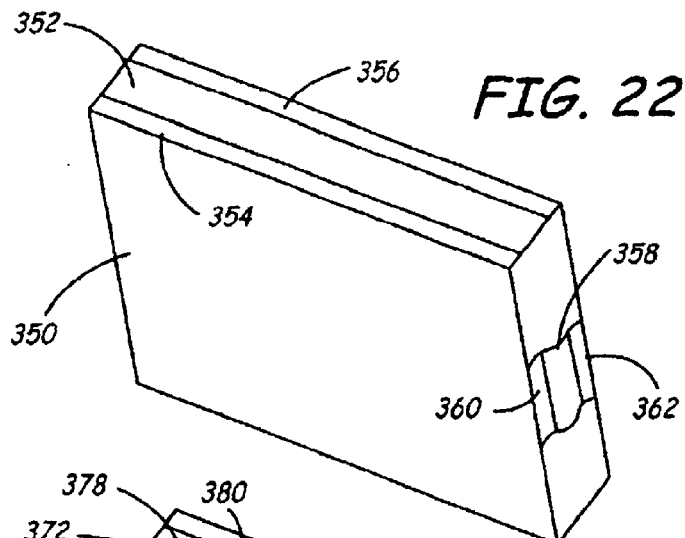
FIG. 22
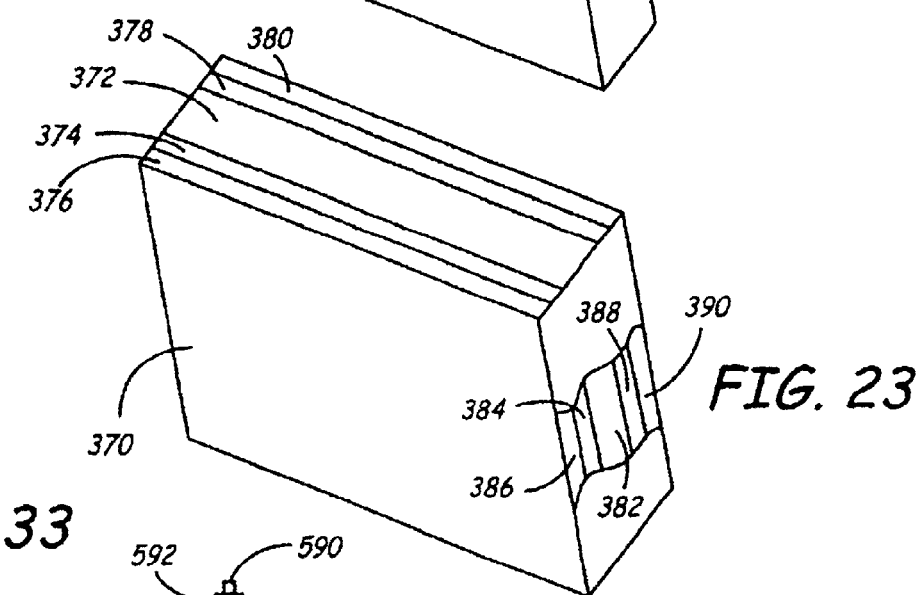
FIG. 23
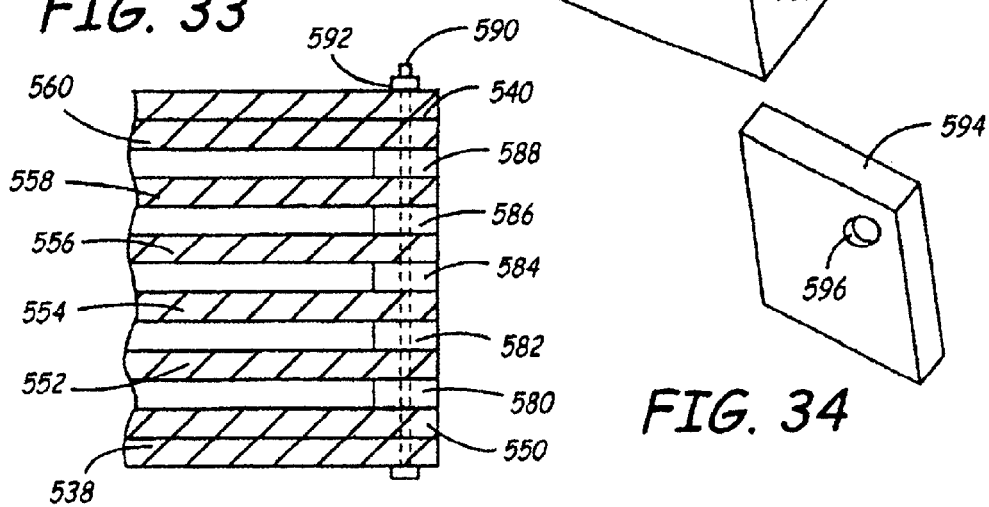
FIG. 33
FIG. 34

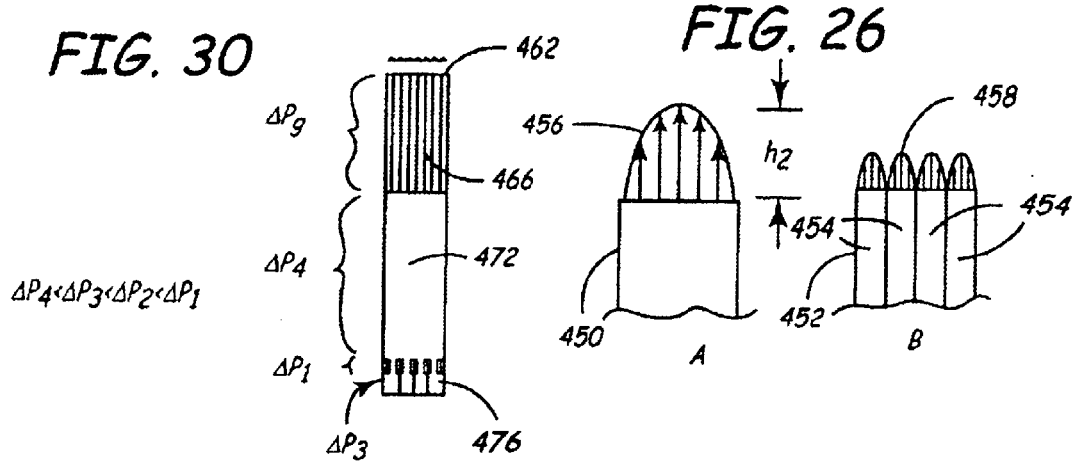
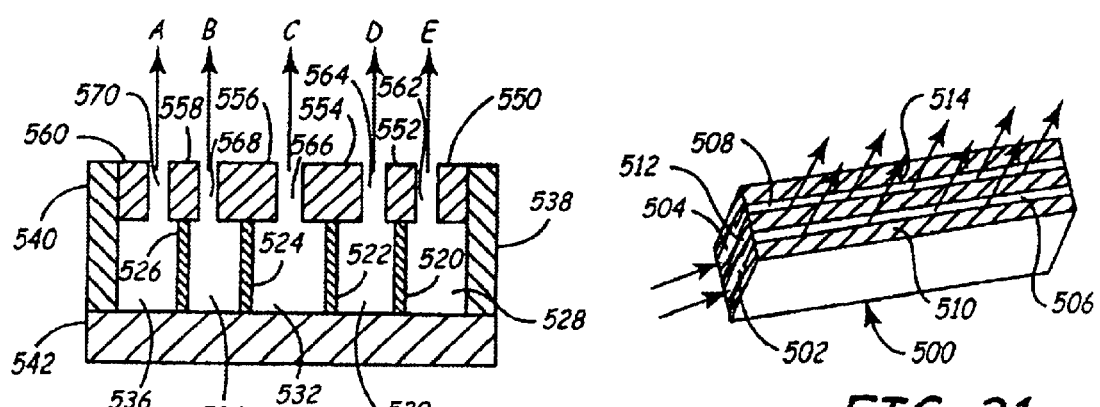
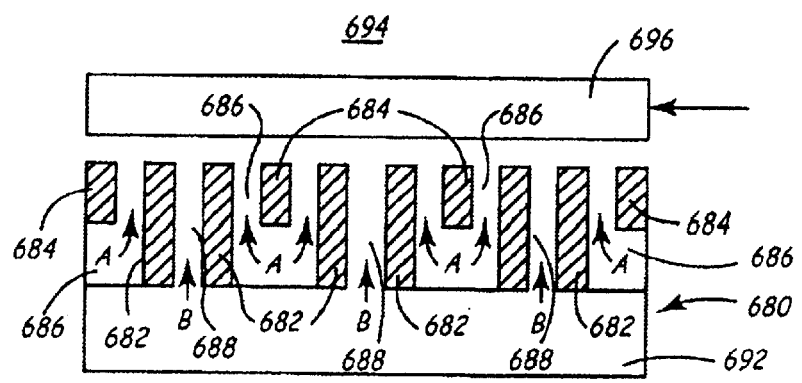

REACTANT NOZZLES WITHIN FLOWING REACTORS

FIELD OF THE INVENTION

The invention relates to improved reactant delivery systems for flowing reactors, such as reactors in which electromagnetic radiation drives the reaction. The reactors can be designed for particle collection and/or direct coating of the particles onto a substrate.

BACKGROUND OF THE INVENTION

There has been growing demand for solid-state materials with submicron dimensions. Submicron particles, especially nanoscale particles, can exhibit unusual chemical, mechanical, electrical, magnetic and optical properties that are different from the corresponding properties of the bulk material and conventional powders. These unusual properties can be exploited in a number of applications. In addition, submicron particles can be applied in coatings for the formation of extremely smooth and uniform coatings.

One advantage of submicron particles relative to larger particles is the increased surface area for a given weight of material. For example, the surface area per weight of nanoscale particles can be one or two orders of magnitude greater than the surface area per is weight of conventional powders. This increase in surface area is desirable for a variety of applications such as those involving catalysis, hydrogen storage and electrical capacitors. The demand for ultrafine chemical powders has resulted in the development of sophisticated techniques, such as laser pyrolysis, for the production of these powders.

Similarly, the consolidation or integration of mechanical, electrical and optical components into integral devices has created enormous demands on material processing. Furthermore, the individual components integrated in the devices are shrinking in size. Therefore, there is considerable interest in the formation of specific compositions applied to substrates. In order to form optical devices with high quality optical compositions from these materials, the corresponding coatings should be highly uniform. Interest in forming highly uniform materials for these coatings has sparked the development of processes to produce the coatings.

SUMMARY OF THE INVENTION

In a first aspect, the invention relates to a reactor comprising a main chamber and a reactant source comprising a reactant inlet nozzle. The reactor can further comprise a radiation source. The reactant inlet nozzle comprises an inlet slot and an elongated throat baffle operably connected to, e.g., adjacent, the inlet slot. The inlet slot opens into the main chamber and is elongated in one direction relative to an orthogonal direction thereof. The elongated throat baffle is operably connected to the inlet slot and modulates the flow into the inlet slot. The radiation source can be oriented to direct radiation through the main chamber to intersect with a reactant stream path from the reactant inlet nozzle.

In a further embodiment, the invention pertains to a reactor comprising a main chamber and a reactant delivery system comprising a reactant inlet nozzle opening into the main chamber. The reactor can further comprise a radiation source. The inlet nozzle comprises a group of at least three aligned elongated inlets opening into the main chamber. The elongated inlets are connected to reactant supplies (e.g., a gas/vapor supply, an aerosol supply and/or suitable combinations thereof) generating increasing reactant velocities emanating from successive inlets when proceeding from the center of the group of aligned inlets to outer inlets. The radiation source can be oriented to direct radiation through the main chamber along an elongated direction of the inlet openings to intersect with a reactant stream path from the reactant inlet nozzle.

In another aspect, the invention pertains to a reactor comprising a main chamber and a reactant delivery apparatus comprising a reactant inlet nozzle that comprises a plurality of inlets opening into the main chamber. The reactor can further comprise a radiation source. The reactant inlet nozzle comprises a plurality of positionable slot plates separated by spacers to form desired slot dimension(s) in which the slot plates form the plurality of inlets. The radiation source can be oriented to direct radiation through the main chamber to intersect with a reactant stream path from the reactant inlet nozzle.

In addition, the invention pertains to a reactor comprising a main chamber and a reactant delivery apparatus comprising a reactant source with a reactant inlet nozzle. The reactor can further comprise a radiation source. The reactant inlet nozzle comprises an inlet opening into the reaction chamber elongated in one dimension relative to an orthogonal dimension thereof. The reactant inlet nozzle is tapered in the direction leading to the inlet opening to reduce the dimension of the flow path corresponding to the elongated direction of the inlet. The radiation source can be oriented to direct radiation through the main chamber to intersect with a reactant stream path from the reactant inlet nozzle.

Furthermore, the invention pertains to a reactor comprising a main chamber and a reactant source comprising a reactant inlet nozzle that comprises a flow grid and a channel from a reactant precursor source to a reactant inlet opening into the main chamber. The reactor can further comprise a radiation source. The flow grid is operably connected to the channel such that the flow grid divides a flow at the reactant inlet opening into a plurality of divided flows. The radiation beam source can be oriented to direct radiation through the main chamber to intersect with a reactant stream path from the reactant inlet nozzle.

In another aspect, the invention pertains to a reactor comprising a main chamber and a reactant source comprising a reactant inlet nozzle that comprises a channel leading to a reactant inlet that opens into the main chamber. The reactor can further comprise a radiation source. The reactant inlet comprises structure that defines an opening with an elongated length and a width having an aspect ratio of at least about 50. The radiation source can be oriented to direct radiation through the main chamber to intersect with a reactant stream path from the reactant inlet nozzle.

In a further aspect, the invention pertains to a reactor comprising a main chamber and a reactant source comprising a reactant inlet nozzle that comprises a channel leading to a reactant inlet that opens into the main chamber. The reactor can further comprise a radiation source. The reactant inlet comprises structure that defines an elongated dimension and a width, i.e., a dimension orthogonal to the elongated dimension, such that the width varies along the elongated dimension in which the width is greater near the ends of the elongated dimension than at the center of the elongated dimension. The radiation source can be oriented to direct radiation through the main chamber along the elongated direction of the opening to intersect with a reactant stream path from the reactant inlet nozzle.

Also, the invention pertains to a reactor comprising a main chamber and a reactant source comprising a reactant inlet that opens into the main chamber. The reactor can further comprise a radiation source. The reactant inlet can be elongated in one dimension relative to an orthogonal dimension thereof with the elongated dimension of the reactant inlet being at least about 5 centimeters. The reactant inlet generates a reactant stream with a velocity along the length of the inlet that at each position differs in magnitude from the average velocity by no more than about 50% of the average of the velocity of flows of the reactant stream. The radiation source can be oriented to direct radiation through the main chamber along the elongated direction of the reactant to intersect with a reactant stream path from the reactant inlet.

Additionally, the invention pertains to a reactor comprising a main chamber and a reactant source comprising a reactant inlet that opens into the main chamber. The reactor can further comprise a radiation source. The reactant source comprises an aerosol generator that generates an aerosol for delivery through the reactant inlet. The reactant inlet comprises an elongated dimension relative to an orthogonal dimension thereof, and the reactant inlet also comprises a plurality of openings separated along the elongated dimension of the inlet with a barrier separating each of the openings from an adjacent opening.

BRIEF DESCRIPTION OF THE DRAWINGS

FIG. 2 is a perspective view of a reactant nozzle delivering reactants to a reaction zone positioned near a substrate.

FIG. 3 is a sectional view of the apparatus of FIG. 2 taken along line 3—3.

FIG. 4 is a top view of the opening of a reactant inlet nozzle that is wider at the ends of an elongated inlet.

FIG. 14 is a fragmentary view showing a close-up of the inlet nozzle and throat baffle of FIG. 13.

FIG. 15 is a perspective view of the throat baffle of FIG. 13.

FIG. 16A is a side view of an alternative embodiment of a throat baffle.

FIG. 16B is a side view of another alternative embodiment of a throat baffle.

FIG. 16C is a side view of still another alternative embodiment of a throat baffle.

FIG. 16D is a side view of a throat baffle with no projecting section.

FIG. 16E is a side view of a throat baffle with a trough in place of a projecting section.

FIG. 22 is a cut-away perspective view of a reactant delivery nozzle with three inlets connected with separate delivery channels, with a portion of the nozzle cut away to show the channels within the nozzle.

FIG. 23 is a cut-away perspective view of a reactant delivery nozzle with five inlets connected with separate delivery channels, with a portion of the nozzle cut away to show the channels within the nozzle.

FIG. 26 is a schematic diagram indicating the flow velocity along an inlet from a standard inlet (panel A) compared to a comparable inlet with a flow grid (panel B).

FIG. 30 is a sectional view of the reactant delivery portion of the inlet nozzle of FIG. 27, in which the view is along the same direction as in FIG. 28.

FIG. 31 is a perspective view of a slot nozzle with two inlets.

FIG. 32 is a sectional view of a slot nozzle with five slots, in which the section is taken perpendicular to the slots.

FIG. 33 is a fragmentary top view of the slot nozzle of FIG. 32.

FIG. 34 is a perspective view of a spacer of the nozzle in FIG. 33.

FIG. 36 is a sectional side view of a reaction chamber slots for the separate delivery of two reactants into a reaction chamber with the cross section taken along a plane through the light reaction zone through the nozzle.

DETAILED DESCRIPTION OF THE ILLUSTRATIVE EMBODIMENTS

Figure 1:
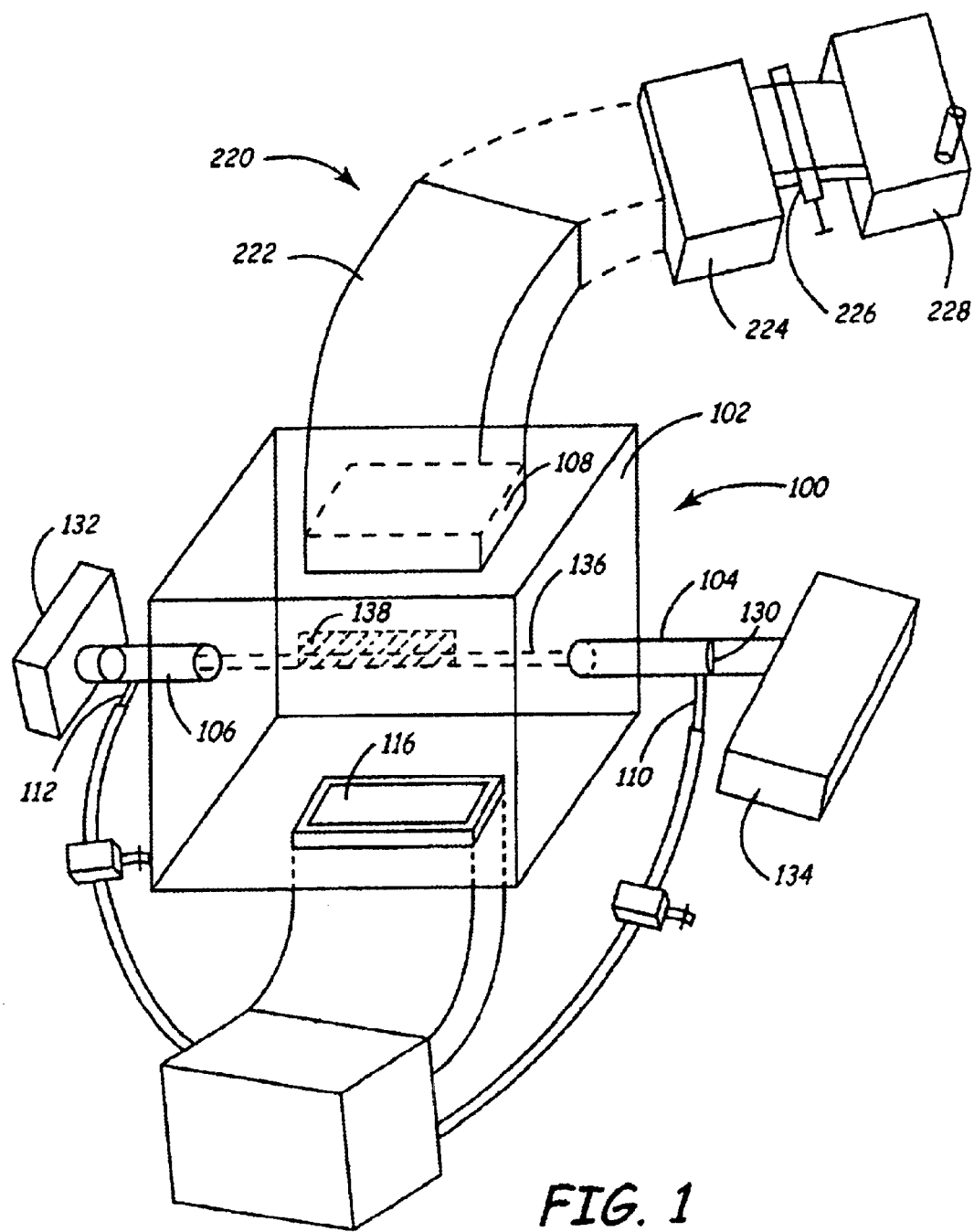
FIG. 1 is a schematic perspective view of a reactor with a flowing reactant stream and a light source to drive the reaction. In this and subsequent figures, the walls of the reactor are shown as transparent to show internal structure.

Improvements in reactant delivery within a flowing reactor can notably improve the performance of the reactor with respect to chamber performance and the uniformity of product particles and/or coatings at a particular production rate. Several inlet nozzle design improvements are described herein. Some improved designs are generally applicable while others are particularly suitable for certain types of reactants. Specifically, some design improvements are intended to provide more uniform reactant flow within the reactor. For flow reactors for powder production and corresponding coating reactors, a more uniform reactant flow generally results in more uniform product particles and/or more uniform coatings. In addition, improving the control of the reactant delivery system can result in less waste and corresponding higher efficiency.

Flow reactors comprise a reaction chamber in which a reactant flow is introduced. Flow is maintained by venting the flow through an exhaust. A chemical reaction is initiated to produce product particles within the flow. The reaction can be driven thermally by heat given off by an exothermic reaction or by a flame such as a hydrogen/oxygen flame. In some embodiments, the reaction is driven by a radiation beam such as a light beam, e.g., from a laser, that supplies the necessary activation energy to initiate and maintain the reaction.

Submicron inorganic particles with various stoichiometries and structures have been produced by pyrolysis, including, for example, laser pyrolysis, alone or with additional processing. By appropriately selecting the composition in the reactant stream and the processing conditions, submicron particles comprising various compositions can be formed. The resulting particles can be collected for use or directly coated onto a substrate. In some embodiments, the coating is performed directly within the reaction chamber. Coating within the reaction chamber presents challenges with respect to controlling the flow within the reaction chamber.

In some embodiments, collections of particles have an average diameter less than a micron and high uniformity of composition. To generate desired submicron particles or coatings of particles, a flowing stream reactor, especially a radiation-based, e.g., light-based, pyrolysis reactor, can be used. When particle formation incorporates an intense light beam as the radiation source for the harvesting of particles, the radiation-based process for the production of submicron powders in a flow is known as laser pyrolysis. For convenience, this application refers to radiation-based pyrolysis and laser pyrolysis interchangeably. Specifically, laser pyrolysis has been found to be an excellent process for efficiently producing submicron (less than about 1 micron average diameter) and nanoscale (less than about 100 nm average diameter) particles with a narrow distribution of average particle diameters, as described further below. In addition, submicron particles produced by laser pyrolysis can be subjected to heating under mild conditions to alter the crystal properties and/or the stoichiometry of the particles or to remove impurities. Similarly, coatings formed from the submicron particles can be further processed, for example, by heating, to form glasses, crystalline coatings or other forms of coatings.

A basic feature of successful application of laser pyrolysis for the production of particles with a desired stoichiometry is generation of a reactant stream containing appropriate precursors to supply the elements that assemble into the product compositions. Similarly, unless the precursors are an appropriate radiation absorber, an additional radiation absorber can be added to the reactant stream. Also, other additional reactants can be used to adjust the oxidizing/reducing environment in the reactant stream.

In laser pyrolysis, the reactant stream is pyrolyzed by an intense radiation beam, such as a laser beam. While a laser beam is a convenient energy source, other intense light sources can be used in laser pyrolysis. Laser pyrolysis provides for formation of phases of materials that are difficult to form under thermodynamic equilibrium conditions. As the reactant stream leaves the light beam, the product particles are rapidly quenched.

Because of the capability of producing particles with high uniformity and narrow particle size distributions, laser pyrolysis is a suitable approach for producing submicron particles. However, other approaches involving flowing reactant streams can be used to synthesize desired submicron particles. Suitable alternative approaches include, for example, flame pyrolysis (flame hydrolysis), thermal pyrolysis, other similar approaches and combinations thereof.

Flame pyrolysis/hydrolysis can be performed with a hydrogen-oxygen flame, wherein the flame supplies the energy to drive the pyrolysis. Such a flame pyrolysis approach should produce similar materials as the laser pyrolysis techniques herein, except that flame pyrolysis approaches generally do not produce comparable high uniformity and a narrow particle size distribution that can be obtained by laser pyrolysis. Importantly, flame pyrolysis is limited to compositions of reaction precursors and oxidizing/reducing agents that will self-sustain the flame. An embodiment of a flame production apparatus is described in U.S. Pat. No. 5,447,708 to Helble et al., entitled "Apparatus for Producing Nanoscale Ceramic Particles," incorporated herein by reference. Furthermore, submicron particles can be produced by adapting the laser pyrolysis methods with a thermal reaction chamber such as the apparatus described in U.S. Pat. No. 4,842,832 to Inoue et al., "Ultrafine Spherical Particles of Metal Oxide and a Method for the Production Thereof," incorporated herein by reference. These approaches generally have lower production rates than are obtainable by laser pyrolysis using recently developed apparatuses with the reaction chamber configured around an elongated reactant inlet. Also, laser pyrolysis provides a continuous source of ignition allowing a wider range of oxidizing and reducing conditions.

To perform laser pyrolysis, one or more reactants can be supplied in vapor form, from a gas source or from a liquid or solid source with sufficient vapor pressure. Alternatively or additionally, one or more reactants can be supplied as an aerosol. In some embodiments, one or more vapor reactants are used along with one or more aerosol reactants. Aerosol reactant delivery provides for the use of a wider range of precursors for laser pyrolysis than are suitable for vapor delivery only. In some cases, less expensive precursors can be used with aerosol delivery. Suitable control of the reaction conditions with the aerosol results in submicron particles with a narrow particle size distribution. Further improvements for control of aerosol reactant delivery are described below.

A new process, radiation-based reactive deposition, has been developed to form highly uniform coatings and devices. Radiation-based reactive deposition involves a flowing reactor with a radiation, e.g., light, driven reaction that is configured for the deposition of particles onto a surface. For convenience, this application refers to radiation-based reactive deposition and light reactive deposition interchangeably. Light reactive deposition incorporates some of the features of laser pyrolysis into a process for direct coating deposition. In one embodiment, reactive deposition driven by a radiation beam (e.g., a light beam) involves a reactor with a flowing reactant stream that intersects a radiation beam proximate a reaction zone to form a product stream configured for the deposition of product particles onto a surface following formation of the particles in the flow.

In addition, a wide range of reaction precursors can be used in either gaseous, vapor, and/or aerosol form, and a wide range of highly uniform product particles can be efficiently produced for deposition in a coating. Reactant delivery approaches developed for laser pyrolysis can be adapted for radiation-based reactive deposition. Radiation-based reactive deposition of submicron particles can produce coatings for various applications. Furthermore, these particle coatings can be further processed to yield desired materials. For example, $SiO_2$ particle coatings can be heated to form consolidated glasses that are suitable for producing optical devices. In particular, the coating can be used to form optical structures with simple or complex collections of corresponding optical devices.

Optical devices can be integrated onto a planar chip-type base similar to an electronic integrated circuit. The production of integrated optical components requires the deposition of high quality optical materials onto the substrate surface. To form the optical devices, multiple optical layers generally are applied with some of the layer being patterned to restrict the layers to particular locations. By fabricating the optical components on a planar substrate, such as a silicon wafer, many optical components can be fabricated simultaneously and squeezed into a very small footprint.

The optical materials can be fashioned into specific devices on the substrate. In particular, a promising technology for the integration of optical components centers around the production of planar waveguides. For the mass production of these integrated optical chips, existing semiconductor technology, such as lithography and etching, can be involved advantageously in appropriate steps of the production process, such as the formation of waveguides following the deposition of optical materials.

Basic characteristics of optical coatings include, for example, surface quality, coating uniformity, optical quality, and other similar coating and optical properties. Optical quality refers to small enough absorption and scattering loss at selected wavelengths to achieve desired levels of transmission. Optical quality also refers to, for example, the uniformity of optical properties, such as index of refraction. In addition, optical quality further relates to interface quality, such as the interface between the waveguiding layers and cladding layers. For silica ($SiO_2$) suitable optical forms can be a glass, while for other materials single crystal forms have the highest quality optical transmission, although multi-phase materials, such as glass-ceramics, may be used in some applications.

As described further below, laser pyrolysis apparatuses have been developed for higher production rates useful in a commercial context. These apparatuses comprise elongated reactant inlets and a chamber designed to control the flow through the light-activated reaction zone, to the reaction chamber exhaust outlet that are connected to a collection system for harvesting the product particles. Adaptation of these designs provide for efficient and rapid substrate coating. The elongated reactant inlets have a length generally in the range(s) of at least about a factor of five times the width in the direction orthogonal to the elongated length, and in some embodiments in the range(s) at least about 10 times the width.

With these commercial design reaction chambers, it is desirable to maintain reactant uniformity and control of the reactant flow over the entire reaction zone at high production rates. In particular, reactant delivery that produces a more uniform reactant stream within the reactor results in more uniform product particles. The uniformity of the reactant stream is especially significant with high production rates and with aerosol reactants, and a uniform reactant stream is significant with respect to the formation of a more uniform coating by light reactive deposition. Particular reactant delivery approaches are described to produce a more uniform reactant stream for vapor reactants and for reactants that comprise an aerosol. In addition, versatile nozzle designs provide for nozzle reconfiguration without the need for chamber redesign.

Particle Synthesis within a Reactant Flow and Particle Properties

Radiation-based pyrolysis/laser pyrolysis has been demonstrated to be a valuable tool for the production of submicron and nanoscale particles. Similarly, light reactive deposition is a valuable approach for applying coatings of submicron and nanoscale particles. Other chemical reaction synthesis methods for producing particles using a flowing reactant stream in a gas flow are discussed above. Many of the apparatus components and principles for reactant delivery described in detail below can be adapted for producing particles and coatings, generally, in flow reactant systems, with or without a light source. Laser pyrolysis is an appropriate approach for synthesizing the particles because laser pyrolysis produces highly uniform and high quality product particles.

In laser pyrolysis, the reaction generally occurs within a reaction chamber. An intense light beam is directed along a light path to intersect a reactant flow. A reaction zone is located at and/or near the intersection of the intense light beam with the reactant flow. Product particles are found within a reactant/product flow beyond the reaction zone. The flow beyond the reaction zone comprises product particles, unreacted reactants and/or reaction facilitators, such as solvents or light absorbing gases, reaction by-products, and inert gases. The product flow is appropriately directed for collection/deposition Flow within the reaction chamber influences the properties of the resulting particles, production rates, performance of the apparatus, efficiency/waste and the collection/deposition of the particles. The initial flow into the reaction chamber comprises the reactants and may also comprise, for example, inert gases, solvent/dispersants, compounds that affect the flow's heat capacity/thermal conductivity to trap heat longer or dissipate heat faster, and compounds that influence the reaction, such as radiation absorbing gases and compounds that affect the oxidizing/reducing environment in the reaction chamber. Specific inlets for introducing one or more reactants, possibly along with other vapors/aerosols, can be termed reactant inlets. Flow is generally initiated through one or more inlets. The flowing compositions exit the chamber through an exhaust.

Generally, product particles can be deposited onto a substrate as a coating within the reaction chamber, or directed to a separate coating chamber for deposition onto a substrate, or directed to a collector for collection as a powder. Whether or not coating is performed within the reaction chamber, the design of the reactant inlet can alter the particle production process and the properties of the resulting particles. In this section, general features are described regarding particle production in a flowing reactor using intense light to drive the reaction, while the improved reactant nozzle inlets are described in following sections.

Light reactive deposition can involve coating within the reaction chamber or within a separate coating chamber connected to the reaction chamber. To perform a coating process within the reaction chamber by light reactive deposition, the substrate is placed in the path of the product stream emanating from the reaction zone. Light reactive deposition is described further in copending and commonly assigned U.S. patent application Ser. No. 09/715,935 to Bi et al., entitled "Coating Formation By Reactive Deposition," incorporated herein by reference and in copending and commonly assigned PCT Application designating the U.S. Application Number PCT/US01/32413, filed on Oct. 16, 2001, entitled "Coating Formation By Reactive Deposition," incorporated herein by reference. If coating is performed in a separate chamber connected to the reaction chamber, the reaction chamber design may not be particularly different from designs used for particle collection using laser pyrolysis.

The collection of particles produced by laser pyrolysis can be performed in a batch mode or in a continuous collection mode. In batch mode, the reactants still flow through the reaction chamber for continuous production until the collector is full. Thus, the exhaust of the reaction chamber can lead to a particle collector, a separate coating chamber, or, if coating is performed within the reaction chamber, a pump, scrubber or the atmosphere.

For radiation driven particle production generally, the reaction conditions determine the qualities of the particles produced. The reaction conditions for laser pyrolysis can be controlled relatively precisely in order to produce particles with desired properties. The appropriate reaction conditions to produce a certain type of particles generally depend on the design of the particular apparatus. Specific conditions used to produce a variety of different particles in some particular apparatuses are described in references cited below. Furthermore, some general observations on the relationship between reaction conditions and the resulting particles can be made.

Increasing the radiation power results in increased reaction temperatures in the reaction region as well as a faster quenching rate. A rapid quenching rate tends to favor production of high energy phases, which may not be obtained with processes near thermal equilibrium. Similarly, increasing the chamber pressure also tends to favor the production of higher energy structures. Also, increasing the concentration of the reactant serving as the oxygen source or other secondary reactant source in the reactant stream favors the production of particles with increased amounts of oxygen or other secondary reactant.

Reactant velocity in the reactant gas stream is inversely related to particle size so that increasing the reactant velocity tends to result in smaller particle sizes. A significant factor in determining particle size is the concentration of product composition condensing into product particles. Reducing the concentration of condensing product compositions generally reduces the particle size. The concentration of condensing product can be controlled by dilution with non-condensing, e.g., inert, compositions or by changing the pressure with a fixed ratio of condensing product to non-condensing compositions, with a reduction in pressure generally leading to reduced concentration and a corresponding reduction in particle size.

Radiation power also influences particle size with increased radiation power favoring larger particle formation for lower melting materials and smaller particle formation for higher melting materials. Also, the growth dynamics of the particles have a significant influence on the size of the resulting particles. In other words, different forms of a product compound have a tendency to form different size particles from other phases under relatively similar conditions. Similarly, under conditions at which populations of particles with different compositions are formed, each population of particles generally has its own characteristic narrow distribution of particle sizes.

Laser pyrolysis has become the standard terminology for chemical reactions driven by an intense light radiation with rapid quenching of product after leaving a narrow reaction region defined by the interpenetration of the collimated light zone and precursor nozzle effluent. The name, however, is a misnomer since a strong, incoherent radiation, e.g., light, beam can replace the laser. Also, the reaction is not a pyrolysis in the sense of a thermal pyrolysis. The laser pyrolysis reaction is not solely thermally driven by the exothermic combustion of the reactants. In fact, some laser pyrolysis reactions can be conducted under conditions where no visible flame is observed from the reaction. Light reactive deposition involves comparable processes for the particle production although other characteristics of the flow are altered to accommodate the coating process.

Generally, the particles of interest are inorganic and comprise one or more metal or metalloid elements. Metalloids are elements that exhibit chemical properties intermediate between or inclusive of metals and nonmetals. Metalloid elements include, for example, silicon, boron, arsenic, antimony, bismuth, and tellurium. To produce desired particles, appropriate precursors are directed into the flowing reactor. One or more precursors are needed to supply the atoms that combine to form the particles. A single precursor composition can comprise the necessary elements such that the light driven reaction is a dissociation or a rearrangement reaction, or a plurality of precursors can be used to supply the necessary atoms that combine in the particles through recombination reactions.

Laser pyrolysis has been performed generally with gas/vapor phase reactants. Many metal/metalloid precursor compounds can be delivered into the reaction chamber as a gas or vapor. Appropriate metal/metalloid precursor compounds for vapor delivery generally comprise metal/metalloid compounds with reasonable vapor pressures, i.e., vapor pressures sufficient to get desired amounts of precursor gas/vapor into the reactant stream.

The vessel holding liquid or solid precursor compounds can be heated to increase the vapor pressure of the metal/metalloid precursor, if desired. Solid precursors generally are heated to produce a sufficient vapor pressure by sublimation. A carrier gas can be bubbled through a liquid precursor to facilitate delivery of a desired amount of precursor vapor. Similarly, a carrier gas can be passed over the solid precursor to facilitate delivery of the precursor vapor. In addition, liquids can be flash vaporized, for example, by flowing the liquid onto a heating element, such as a porous metal, held at a temperature above the liquid's boiling point.

Some representative precursors are described as examples of the types of suitable precursor compounds. Suitable lithium precursors for vapor delivery include, for example, solids, such as lithium acetate ($Li_2O_2CCH_3$), and liquids, such as lithium amide ($LiNH_2$) dissolved in hexane, as well as similar compositions and combinations thereof. Suitable liquid iron precursors for vapor delivery include, for example, iron carbonyl ($Fe(CO)_5$). Suitable liquid, aluminum precursors include, for example, aluminum s-butoxide ($Al(OC_4H_9)_3$) and similar compositions and combinations thereof. A number of suitable solid, aluminum precursor compounds are available including, for example, aluminum chloride ($AlCl_3$), aluminum ethoxide ($Al(OC_2H_5)_3$), aluminum isopropoxide ($Al[OCH(CH_3)_2]_3$) as well as similar compositions and combinations thereof. Suitable silicon precursors for vapor delivery include, for example, silicon tetrachloride ($SiCl_4$), trichlorosilane ($Cl_3HSi$), trichloromethyl silane $CH_3SiCl_3$, tetraethoxysilane ($Si(OC_2H_5)_4$, also known as ethyl silane and tetraethyl silane) and similar compositions and combinations thereof.

The use of exclusively gas phase reactants is somewhat limiting with respect to the types of precursor compounds that can be used conveniently. Thus, techniques have been developed to introduce aerosols containing metal/metalloid precursors into laser pyrolysis chambers. Improved aerosol delivery apparatuses for reaction systems are described further in commonly assigned and copending U.S. Pat. No. 6,193,936 to Gardner et al., entitled "Reactant Delivery Apparatuses," incorporated herein by reference.

Using aerosol delivery apparatuses, solid precursor compounds can be delivered by dissolving the compounds in a solvent. Alternatively, powdered precursor compounds can be dispersed in a liquid/solvent for aerosol delivery. Liquid precursor compounds can be delivered as an aerosol from a neat liquid, a multiple liquid dispersion or a liquid solution. A solvent/dispersant can be selected to achieve desired properties of the resulting solution/dispersion. Suitable solvents/dispersants include, for example, water, methanol, ethanol, isopropyl alcohol, other organic solvents and mixtures thereof. The solvent should have a desired level of purity such that the resulting particles have a desired purity level. Some solvents, such as isopropyl alcohol, are significant absorbers of infrared light from a $CO_2$ laser such that no additional laser absorbing compound may be needed within the reactant stream if a $CO_2$ laser is used as a light source.

If aerosol precursors are formed with a solvent present, the solvent can be rapidly evaporated by the light beam in the reaction chamber. Thus, the fundamental features of the laser pyrolysis reaction as a gas phase reaction are unchanged by the presence of an aerosol. Nevertheless, the reaction conditions are affected by the presence of the aerosol. Below, references are cited that describe conditions for the production of nanoscale particles by laser pyrolysis using aerosol precursors.

Some representative precursors for aerosol delivery are described as examples of suitable precursor types. Suitable lithium precursors for aerosol delivery from solution include, for example, lithium acetate ($LiCH_3CO_2$), which is soluble in water and alcohol, lithium chloride (LiCl), which is somewhat soluble in water, alcohol and some other organic solvents, lithium hydroxide (LiOH) and lithium nitrate ($LiNO_3$), which are somewhat soluble in water and alcohol, and similar compositions and sutiable combinations thereof. Suitable iron precursors for aerosol delivery include, for example, ferrous chloride ($FeCl_2$), which is soluble in water, alcohol and acetone, ferrous acetate ($Fe(O_2CCH_3)_2$, similar compositions and suitable combinations thereof. Suitable aluminum precursors for aerosol delivery include, for example, aluminum chloride ($AlCl_3$), which is soluble in many organic solvents, aluminum hydroxychloride ($Al_2(OH)_5Cl.2H_2O$), which is soluble in water, similar compositions and suitable combinations thereof. Suitable silicon precursors for aerosol production include, for example, silicon tetrachloride $Si(Cl_4)$, which is soluble in ether, trichlorosilane ($Cl_3HSi$), which is soluble in carbon tetrachloride, similar compositions and suitable combinations thereof.

The precursor compounds for aerosol delivery are dissolved in a solution in some embodiments with a concentration in the range(s) at least about 0.2 molar. Generally, a greater concentration of precursor in the solution corresponds to a greater throughput of reactant through the reaction chamber. As the concentration increases, however, the solution can become more viscous such that the aerosol may have droplets with larger sizes than desired and may result in larger product particles. Thus, selection of solution concentration can involve a balance of factors in the selection of an appropriate solution concentration.

Various secondary reactants, which can serve as an oxygen source or to alter the reduction/oxydizing nature in the reaction chamber include, for example, $O_2$, CO, $H_2O$, $CO_2$, $O_3$ and suitable mixtures thereof. Molecular oxygen can be supplied as air. The secondary reactant compound should not react significantly with the metal/metalloid precursor prior to entering the reaction zone since this generally would result in the formation of large particles. If the reactants are spontaneously reactive, the metal/metalloid precursor and the secondary reactant can be delivered in separate nozzles into the reaction chamber such that they are combined just prior to reaching the light beam.

Laser pyrolysis can be performed with a variety of optical frequencies, using either a laser or other strong light source, such as a focused light beam. Suitable light sources operate in the infrared portion of the electromagnetic spectrum. $CO_2$ lasers are particularly appropriate sources of light. Infrared absorbers for inclusion in the reactant stream include, for example, $C_2H_4$, isopropyl alcohol, $NH_3$, $SF_6$, $SiH_4$, $O_3$ and suitable mixtures thereof. $O_3$ can act as both an infrared absorber and as an oxygen source. The radiation absorber, such as the infrared absorber, absorbs energy from the radiation beam and distributes the energy to the other reactants to drive the reaction.

Generally, the energy absorbed from the light beam increases the temperature at a tremendous rate, many times the rate that heat generally would be produced by exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction. Thus, while the light driven process is referred to as laser pyrolysis, it is not a purely thermal process even though traditional pyrolysis is a thermal process.

An inert shielding gas can be used to reduce the amount of reactant and product molecules contacting the reactant chamber components. Shielding gas also tends to confine or entrain the reactant stream until it reaches the light activated reaction zone. Inert gases can also be introduced into the reactant stream as a carrier gas, as a reaction moderator, and/or to shield components within the reaction chamber. Appropriate inert gases generally include, for example, Ar, He, $N_2$ and suitable mixtures thereof.

A collection of particles of interest generally has an average diameter for the primary particles in a range of no more than about 1000 nm, in additional embodiments in a range of no more than about 500 nm, in other embodiments in a range from about 2 nm to about 100 nm, in further embodiments in a range from about 5 nm to about 75 nm, and still other embodiments in a range from about 5 nm to about 50 nm. A person of ordinary skill in the art will recognize that average diameter ranges and subranges within these specific ranges are also contemplated and are within the present disclosure. Particle diameters generally are evaluated by transmission electron microscopy. Diameter measurements on particles with asymmetries are based on an average of length measurements along the approximate principle axes of the particle.

The primary particles usually have a roughly spherical gross appearance. After any heat treatment, the particles may be less spherical and sufficient heating can result in sintering and/or consolidation/densification of the particles. Upon closer examination, crystalline particles generally have facets corresponding to the underlying crystal lattice. Nevertheless, crystalline primary particles tend to exhibit growth in laser pyrolysis that is roughly equal in the three physical dimensions to give a gross spherical appearance. Amorphous particles generally have an even more spherical aspect In some embodiments, 95 percent of the primary particles, and in further embodiments 99 percent, have ratios of the dimension along the major axis to the dimension along the minor axis less than about 2.

Because of their small size, the primary particles tend to form loose agglomerates, i.e., secondary particles, due to van der Waals and other electromagnetic forces between nearby particles. These agglomerates can be redispersed completely or, at least, to a significant degree, if desired. Even though the particles form loose agglomerates, the nanometer scale of the primary particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material. For example, vanadium oxide nanoparticles can exhibit surprisingly high energy densities in lithium batteries, as described in U.S. Pat. No. 5,952,125 to Bi et al., entitled "Batteries With Electroactive Nanoparticles," incorporated herein by reference.

When forming a coating directly onto a substrate surface, the particles on the surface can form a powder array, i.e. a network of fused or partly fused particles in which at least some characteristics of the initial primary particles are reflected within the array. The relative or apparent density of the powder array can depend on the particle size, particle composition and the deposition conditions, which may affect particle fusing as well as the forces between the particles and with the surface. The relative density is evaluated relative to the fully densified material of the same composition. In general, the relative density for the powder array formed from nanoscale particles is in the range(s) of less than about 0.6, in other embodiments in the range(s) from about 0.02 to about 0.55 and in further embodiments in the range(s) from about 0.05 to about 0.4. A person of ordinary skill in the art will recognize that additional ranges within these specific ranges are contemplated and are within the present disclosure.

The primary particles can have a high degree of uniformity in size. Laser pyrolysis and light reactive deposition can result in particles having a very narrow range of particle diameters if reactant flow is appropriately controlled. Furthermore, heat processing under suitably mild conditions does not alter the very narrow range of particle diameters. With aerosol delivery of reactants for laser pyrolysis, the distribution of particle diameters is particularly sensitive to the reaction conditions. As determined from examination of transmission electron micrographs, the primary particles generally have a distribution in sizes such that in the range(s) of at least about 95 percent, and in further embodiments 99 percent, of the primary particles have a diameter greater than about 40 percent of the average diameter and less than about 225 percent of the average diameter. In some embodiments, the primary particles have a distribution of diameters such that in the range(s) of at least about 95 percent, and in further embodiments 99 percent, of the primary particles have a diameter greater than about 45 percent of the average diameter and less than about 200 percent of the average diameter. A person of ordinary skill in the art will recognize that ranges and subranges within these specific ranges are contemplated and are within the present disclosure. In some coating applications, it may be desirable to have a less narrow distribution of particle sizes to achieve a higher packing density of the particles.

Furthermore, in some embodiments substantially no primary particles have an as average diameter in the range(s) of no more than about 5 times the average diameter, and in other embodiments no more than about 4 times the average diameter, and in further embodiments no more than about 3 times the average diameter. In other words, the particle size distribution effectively does not have a tail indicative of a small number of particles with significantly larger sizes. A person of ordinary skill in the art will recognize that ranges and subranges within these specific ranges are contemplated and are within the present disclosure. This characteristic of the particle size distribution is a result of the small reaction region and corresponding rapid quench of the particles. An effective cut off in the tail of the size distribution indicates that there are less than about 1 particle in $10^6$ that have a diameter greater than a specified cut off value above the average diameter. Narrow size distributions, lack of a tail in the distributions and the roughly spherical morphology can be exploited in a variety of applications.

In light reactive deposition, small particle size and particle uniformity contribute to the uniformity of the resulting coating. In particular, the lack of particles significantly larger than the average, i.e., the lack of a tail in the particle size distribution, leads to a more uniform, flatter and smoother coatings. While the lack of particles significantly larger than average are desirable for coatings, higher packing densities may be achievable if the peak of the distribution is not too narrow.

Silicon oxide glass coatings following heating have been formed by light reactive deposition that have a root mean square surface roughness, as measured by atomic force microscopy, of about 0.25 to about 0.5 nm. Thus, the surfaces are smoother than are thought to be obtained by flame hydrolysis deposition and roughly comparable to smoothnesses obtainable by chemical vapor deposition. These smooth glass coatings, applied by light reactive deposition were deposited at relatively high deposition rates by moving the substrate through the product stream. Thus, light reactive deposition has already demonstrated the ability to be an efficient and effective approach for the formation of very high quality glass coatings.

Several different types of nanoscale particles have been produced by laser pyrolysis. Similar particles can be produced by light reactive deposition using comparably selected precursor and precursor delivery.

For example, the production of silicon oxide nanoparticles is described in copending and commonly assigned U.S. patent application Ser. No. 09/085,514 to Kumar et al., entitled "Silicon Oxide Particles," incorporated herein by reference. This patent application describes the production of amorphous $SiO_2$. The production of titanium oxide nanoparticles and crystalline silicon dioxide nanoparticles is described in copending and commonly assigned, U.S. patent application Ser. No. 09/123,255 to Bi et al., entitled "Metal (Silicon) Oxide/Carbon Composites," incorporated herein by reference. In particular, this application describes the production of anatase and rutile $TiO_2$.

In addition, nanoscale manganese oxide particles have been formed. The production of these particles is described in copending and commonly assigned U.S. patent application Ser. No. 09/188,770 to Kumar et al., entitled "Metal Oxide Particles," incorporated herein by reference. This application describes the production of MnO, $Mn_2O_3$, $Mn_3O_4$ and $Mn_5O_8$. The production of aluminum oxide nanoparticles is described in copending and commonly assigned, U.S. patent application Ser. No. 09/136,483 to Kumar et al., entitled "Aluminum Oxide Particles," incorporated herein by reference. In particular, this application disclosed the production of γ-$Al_2O_3$.

Also, tin oxide nanoparticles have been produced by laser pyrolysis, as described in copending and commonly assigned U.S. patent application Ser. No. 09/042,227 to Kumar et al., entitled "Tin Oxide Particles," incorporated herein by reference. The production of zinc oxide nanoparticles is described in copending and commonly assigned U.S. patent application Ser. No. 09/266,202 to Reitz, entitled "Zinc Oxide Particles," incorporated herein by reference. In particular, the production of ZnO nanoparticles is described.

The production of iron, iron oxide and iron carbide is described in a publication by Bi et al., entitled "Nanocrystalline α-Fe, $Fe_3C$, and $Fe_7C_3$ produced by $CO_2$ laser pyrolysis," J. Mater. Res. Vol. 8, No. 7 1666–1674 (July 1993), incorporated herein by reference. The production of nanoparticles of silver metal is described in copending and commonly assigned U.S. patent application Ser. No. 09/311,506 to Reitz et al., entitled "Metal Vanadium Oxide Particles," incorporated herein by reference. Nanoscale carbon particles produced by laser pyrolysis is described in a reference by Bi et al., entitled "Nanoscale carbon blacks produced by $CO_2$ laser pyrolysis," J. Mater. Res. Vol. 10, No. 11, 2875–2884 (November 1995), incorporated herein by reference.

The production of iron sulfide ($Fe_{1-x}S$) nanoparticles by laser pyrolysis is described in Bi et al., Material Research Society Symposium Proceedings, vol 286, p. 161–166 (1993), incorporated herein by reference. Precursors for laser pyrolysis production of iron sulfide were iron pentacarbonyl ($Fe(CO)_5$) and hydrogen sulfide ($H_2S$).

Cerium oxide can be produced using the laser pyrolysis apparatuses described above. Suitable precursors for aerosol delivery include, for example, cerous nitrate ($Ce(NO_3)_3$), cerous chloride ($CeCl_3$), cerous oxalate ($Ce_2(C_2O_4)_3$), similar compositions, and suitable combinations thereof. Similarly, zirconium oxide can be produced using the laser pyrolysis apparatuses described above. Suitable zirconium precursors for aerosol delivery include, for example, zirconyl chloride ($ZrOCl_2$), zirconyl nitrate ($ZrO(NO_3)_2$), similar compositions and suitable combinations thereof.

The production of ternary nanoparticles of aluminum silicate and aluminum titanate can be performed by laser pyrolysis following procedures similar to the production of silver vanadium oxide nanoparticles described in copending and commonly assigned U.S. patent application Ser. No. 09/311,506 to Reitz et al., entitled "Metal Vanadium Oxide Particles," incorporated herein by reference. Suitable precursors for the production of aluminum silicate include, for vapor delivery, a mixture of aluminum chloride ($AlCl_3$) and silicon tetrachloride ($SiCl_4$) and, for aerosol delivery, a mixture of tetra(N-butoxy) silane and aluminum isopropoxide ($Al(OCH(CH_3)_2)_3$) as well as similar compositions and suitable combinations thereof. Similarly, suitable precursors for the production of aluminum titanate include, for aerosol delivery, a mixture of aluminum nitrate ($Al(NO_3)_3$) and titanium dioxide ($TiO_2$) powder dissolved in sulfuric acid, a mixture of aluminum isopropoxide and titanium isopropoxide ($Ti(OCH(CH_3)_2)_4$), as well as similar compositions and suitable combinations thereof.

The synthesis by laser pyrolysis of silicon carbide and silicon nitride is described in copending and commonly assigned U.S. patent application Ser. No. 09/433,202 to Reitz et al., entitled "Particle Dispersions," incorporated herein by reference.

A further description of compositions that can be generate by laser pyrolysis and light reactive deposition are described in copending and commonly assigned U.S. patent application Ser. No. 10/027,906 to Bi et al., entitled "Three Dimensional Engineering Of Optical Structures," incorporated herein by reference and in copending and commonly assigned PCT applications designating the U.S. Application Number PCT/US01/32413, filed on Oct. 16, 2001, entitled "Coating Formation By Reactive Deposition," incorporated herein by reference. In addition, the production of particles and the deposition of materials, in particular for optical applications, is described further in copending and commonly assigned, U.S. patent applications Ser. No. 10/099,597 to Bi et al. filed on Mar. 15, 2002, entitled "Optical Materials And Optical Devices," incorporated herein by reference.

Flowing Reactor Apparatus

An appropriate laser pyrolysis apparatus or a light reactive deposition apparatus generally comprises a reaction chamber isolated from the ambient environment. One or more reactant inlets connected to a reactant delivery apparatus produces a flowing reactant stream through the reaction chamber. The flowing reactant stream comprises gas, vapor, such as liquid vapor or solid vapor, aerosol, a solid reactant particle flow within a gas or liquid flow and/or suitable combinations thereof. The aerosol can comprise liquid and/or solid particles in a flow, possibly entrained in a gas/vapor flow. A light beam path intersects the reactant stream at a reaction zone. The reactant/product stream continues after the reaction zone to an outlet and, in some coating embodiments, a substrate surface for coating, which intercepts at least a portion of the flow. The outlet serves as an exhaust to remove product particles or residual product particles following coating onto a substrate, as well as other compositions within the flow from the reaction chamber. Generally, the light source, such as a laser, is located external to the reaction chamber, and the light beam enters the reaction chamber through an appropriate window.

For reaction chambers that are used to produce particles for collection and subsequent use, an exhaust from the reaction chamber generally is positioned such that the reactant flow from one or more inlets with the majority of the flow capacity has a straight path directly to the exhaust. Generally, one or more aligned reactant inlets introduce a majority of the total flow along a common path through the reaction chamber passing through the reaction zone. By positioning the exhaust opposite reactant inlet(s) and by reducing extraneous volumes, turbulence and recirculation can be reduced.

Furthermore, the reactant inlet nozzle can be designed to adjust the reactant flow from the nozzle. For example, the shape of the nozzle and dimensions of the nozzle inlet can be adjusted to obtain a particular flow. In addition, for gas/vapor reactants, a baffle can be placed within the nozzle to produce a more uniform gas flow or to produce a velocity profile that yields a more uniform coating. As an alternative to the use of a baffle, a flow grid can divide the flow to produce a straighter flow with reduced transverse momentum. A flow grid also can lead to a more uniform mass flux along the nozzle. For aerosol reactants, aerosol baffles can be placed within the nozzle to produce a more uniform aerosol flow as well as reducing transverse momentum and attenuating momentum magnitude. Furthermore, a plurality of reactant inlets can be used in one or more nozzles. In some improved embodiments, the nozzle has adjustable components such that the dimensions and number of inlets associated with the nozzle can be adjusted to yield particular objectives.

In general, the reaction chamber for performing laser pyrolysis or light reactive deposition has a nozzle that connects to a reactant delivery system, an optical beam path with corresponding optical components, optional inert gas channels to provide shielding gases, and an exhaust port. For light reactive deposition, the reaction chamber can include components, such as stages, conveyors or the like, to enable the coating process within the coating chamber.

One configuration of a reaction chamber is shown schematically in FIG. 1. Reaction chamber 100 comprises a main chamber 102, optical tubes 104, 106, an exhaust nozzle 108, inert gas feeds 110, 112 and reactant inlet nozzle 116. Main chamber 102 contains the reaction during the production process. As shown in FIG. 1, reactant inlet nozzle 116 is positioned at the bottom of main chamber 102, although the orientation can be reversed with the reactant inlet at the top or placed at other angles. Similarly, a plurality of inlet nozzles can be used.

Main Chamber

A main chamber for laser pyrolysis has been designed for the production of commercial quantities of powders. In this design, the chamber is configured to conform roughly to the elongated shape of a reactant inlet. This design of the chamber is intended to facilitate high production rates by providing large flux of materials through the chamber while making efficient use of resources and by reducing dead volume in the chamber.

A laser pyrolysis apparatus based on this improved main chamber design for commercial scale production is described further in U.S. Pat. No. 5,958,348 to Bi et al., entitled "Efficient Production of Particles by Chemical Reaction," incorporated herein by reference. This chamber design can be adapted for use in light reactive deposition. Additional embodiments and other appropriate features for commercial capacity laser pyrolysis apparatuses are described in copending and commonly assigned U.S. patent application Ser. No. 09/362,631 to Mosso et al., entitled "Particle Production Apparatus," incorporated herein by reference.

Based on these commercial scale laser pyrolysis reaction chamber designs, the shape and size of the main chamber can be adjusted to achieve desired production rates, resource utilization and product stream shapes within the chamber. In some embodiments, the reactant inlet is generally elongated in one dimension relative to the orthogonal direction to obtain significant reactant flux through the chamber. The light path generally is oriented along the elongated dimension of the reactant inlet such that the entire reactant stream flowing through the chamber is illuminated simultaneously at the reaction zone. The chamber is generally configured to match the shape of the reactant flow, which reduces the dead volume.

Any configuration of the reaction chamber to conform to the reactant flow may have to accommodate any coating apparatus structure placed within the chamber. Using a laser pyrolysis apparatus without any accommodation to accelerate particle cooling, the size of the chamber should not be made too small along the flow direction for certain applications since the product particles cool within the chamber prior to collection or coating. For coating applications, the desired temperature of the particles striking the substrate surface may depend on the particular materials and subsequent processing, such that less cooling may be appropriate or desired in some coating applications.

Various configurations can be used to sweep the product stream across the substrate surface to provide a coating across all or the desired portion of the substrate surface. One embodiment is shown in FIGS. 2 and 3. A substrate 150 moves relative to a reactant inlet nozzle 116, as indicated by the arrow at the leading edge of substrate 150. In alternative embodiments, the substrate remains fixed while the nozzle moves to sweep product over the substrate as a coating. Reactant inlet nozzle 116 can be located near substrate 150. Optical path 136 can be located between reactant inlet nozzle 116 and substrate 150. The hot, newly formed, particles tend to stick to the cooler substrate surface. A sectional view is shown in FIG. 3. A particle coating 152 is formed as the substrate is scanned past the reaction zone. In some embodiment, the reactant inlet nozzle has an elongated dimension equal to or slightly greater than one dimension of the substrate such that the substrate can be simultaneously coated along the entire extent of the particular dimension of the substrate as the substrate is swept through the product stream such that the entire substrate can be coated in one sweep. In other embodiments, more than one sweep is made to form a single layer on the substrate. Additional layers of the same or different material can be added, as desired.

In general, substrate 150 can be carried on a conveyor/stage 154, as shown in FIG. 2. In some embodiments, the stage/conveyor extends beyond the edges of the substrate to reduce edge effects in the coating process to form a more uniform coating. With changes in the flow near edges due to deflection of the stream by the substrate and the stage/conveyor, different coating thicknesses tend to be deposited near edges.

In some embodiments, the position of conveyor/stage 154 can be adjusted to alter the distance from substrate 150 to the reaction zone. Changes in the distance from substrate to the reaction zone correspondingly affect the temperature and kinetic energy of the particles striking the substrate. The temperature of the particles striking the substrate generally alters the properties of the resulting coating and the requirements for subsequent processing, such as a subsequent heat processing consolidation of the coating. The temperature and kinetic energy also effect the sticking to the substrate.

The distance between the substrate and the reaction zone can be adjusted empirically to produce desired coating properties. In addition, the stage/conveyor supporting the substrate can comprise thermal control features such that the temperature of the substrate can be adjusted to higher or lower temperatures, as desired. Approaches for coating formation within a reaction chamber with a light source to drive the reaction is described further in copending and commonly assigned U.S. patent application Ser. No. 09/715,935 to Bi et al., entitled "Coating Formation By Reactive Deposition," incorporated herein by reference, and in copending and commonly assigned PCT application PCT/US01/32413 designating the U.S. to Bi et al., entitled "Coating Formation By Reactive Deposition," incorporated herein by reference.

The apparatuses provide that the rate of production and/or deposition of the particles can be varied substantially, depending on a number of factors (e.g., the starting materials being utilized, the desired reaction product, the reaction conditions, the deposition efficiency, and the like, and suitable combinations thereof). Thus, in one embodiment, the rate of particle production can vary in the range(s) from about 5 grams per hour of reaction product to about 10 kilograms per hour of desired reaction product. Specifically, using apparatuses described herein, coating can be accomplished at particle production rates in the range(s) of up to at least about 10 kilograms per hour (kg/hr), in other embodiments at least about 1 kg/hr, in other embodiments with lower production rates at least about 25 grams per hour (g/hr) and in additional embodiments at least about 5 g/hr. A person of ordinary skill in the art will recognize that production rates intermediate between these explicit production rates are contemplated and are within the present disclosure. Exemplary rates of particle production (in units of grams produced per hour) include not less than about 5, 10, 50, 100, 250, 500, 1000, 2500, 5000, or 10000.

In the coating embodiments, not all of the particles generated are deposited on the substrate. In general the deposition efficiency depends on the relative speed of the substrate through the product stream with the particles, for embodiments based on moving the substrate through a sheet of product particles. At moderate relative rates of substrate motion, coating efficiencies in the range(s) of greater than about 15 percent (e.g., about 15 to about 20 percent) have been achieved. In the foregoing exemplary range about 15 to about 20 percent of the produced particles are deposited on the substrate surface. Routine optimization can increase this deposition efficiency further. At slower relative motion of the substrate through the product particle stream, deposition efficiencies in the range(s) of at least about 40% have been achieved. In some embodiments, the rates of particle production are such that in the range(s) at least about 5 grams per hour, or alternatively or in addition, at least about 25 grams per hour, of reaction product are deposited on the substrate. In general, with the achievable particle production rates and deposition efficiencies, deposition rates can be obtained in the range(s) of at least about 5 g/hr, in other embodiments in the range(s) of at least about 25 g/hr, in further embodiments at least in the range(s) from about 100 g/hr to about 5 kg/hr and in still other embodiment in the range(s) from about 250 g/hr to about 2.5 kg/hr. A person of ordinary skill in the art will recognize that deposition rates in ranges between these explicit ranges of rates are contemplated and are within the present disclosure. Exemplary rates of particle deposition (in units of grams deposited per hour) include not less than about 5, 10, 25, 50, 100, 250, 500, 1000, 2500, or 5000.

Alternatively or in addition, the invention provides that the rate of the movement of the substrate and the particle flow relative to each other can vary substantially, depending on the desired specifications for the coated substrate. Thus, in one embodiment, the rate can be measured on an absolute scale, and can vary in the range(s) from about 0.001 inches per second to about 12 inches per second, or even more. Further, in another embodiment, the rate can be measured on a scale relative to the substrate being coated, and can vary in the range(s) from about 1 substrate per minute to about 1 substrate per second.

For appropriate embodiments using a sheet of product particles, the rate of substrate motion generally is a function of the selected deposition rate and the desired coating thickness as limited by the ability to move the substrate at the desired rate while obtaining desired coating uniformity. Due to the high deposition rates achievable with light reactive deposition, extremely fast coating rates are easily achievable. These coating rates by LRD are dramatically faster than rates that are achievable by competing methods. In particular, at particle production rates of about 10 kg/hr, an eight-inch wafer can be coated with a thickness of about 10 microns of powder in approximately one second even at a deposition efficiency of only about 2.5 percent, assuming a powder density of about 10% of the bulk density. A person of ordinary skill in the art can calculate with simple geometric principles a particular one of the following variables based on knowledge of one or more of the remainder of the variables: the coating rate, the deposition rate (e.g., the rate for depositing a certain thickness), the thickness and the density of powder on the substrate.

In particular, apparatus designs based on an actuator arm moving a substrate through the product particle stream within a reaction chamber, as described herein, can straightforwardly move a substrate at rates to coat an entire eight-inch wafer in about 1 second or less. Generally, in embodiments of particular interest that take advantage of the rapid rates achievable, substrate surfaces are coated at linear rates in the range(s) of at least about 0.1 centimeters per second (cm/s), in additional embodiments in the range(s) of at least about 0.5 cm/s, in other embodiments in the range(s) of at least about 1 cm/s, in further embodiments in the range(s) from about 2 cm/s to about 30 cm/s, and in other embodiments in the range(s) from about 5 cm/s to about 30 cm/s.

A person of ordinary skill in the art will recognize that coating rates in ranges intermediate between these explicit ranges of rates are contemplated and are within the present disclosure.

Optical Tubes

Referring to FIG. 1, optical tubes 104, 106 provide for passage of light through the chamber. Optical tube 104 generally comprises an optical component(s) 130, which is connected to tube 104 with a tight seal such that chamber 100 can be isolated from the ambient atmosphere. Suitable optical component(s) 130 can comprise, for example, cylindrical lenses, spherical lenses, telescopic optics, planar and curved mirrors, partially reflective mirrors, corner cube reflectors and/or planar windows. Similarly, optical tube 106 generally has an optical component(s) 132, which generally is connected to tube 106 with a tight seal such that chamber 100 can be isolated from the ambient atmosphere. Suitable optical component(s) 132 can comprise, for example, beam dumps, lenses and/or planar windows. Suitable beam dumps comprise power meters, such as those available from Coherent Inc., Santa Clara, Calif.

Optical tubes 104, 106 generally have a sufficient length such that optical component(s) 130, 132 are spaced away from main chamber 102 to reduce contamination of optical components 130, 132 by compositions/powders passing through main chamber 102. If flow through the reaction chamber is appropriately controlled to isolate reactants and products away from chamber components, optical tubes 104 and/or 106 may not be used. If optical tubes 104 and/or 106 are not used, optical component(s) 130 and/or optical component(s) 132 can be placed in a corresponding mount connected to the wall of main chamber 102.

A light source 134 generally is positioned to direct an intense light beam along optical tube 104. This intense light beam follows an optical path 136 defined by optical components 130, 132. Optical path 136 extends along optical tube 104, through main chamber 102 and along optical tube 106. Optical path 136 intersects a reactant stream flowing from reactant inlet nozzle 116 at a reaction zone 138 at which the chemical reaction takes place to form the product particles. Reaction zone 138 overlaps with optical path 136.

Exhaust Nozzle

Exhaust nozzle 108 provides for flow out from the reaction chamber. The rate of flow can be adjusted by the pumping rate through the exhaust nozzle to maintain approximately a selected chamber pressure. Exhaust nozzle 108 may or may not extend into the reaction chamber from the surface of main chamber 102.

The size of exhaust nozzle 108 can be selected to provide a desired flow through main chamber 102. The exhaust nozzle 108 can extend along an entire side of main chamber 102. If there is no change in cross sectional area along main chamber 102 corresponding to the opening of the exhaust nozzle, the exhaust nozzle can be identified at the position at which the direction of the flow is altered or at which a collector or another chamber is located.

The exhaust nozzle(s) generally leads to a pump directly or first through a coating chamber, if coating is not performed in the reaction chamber. As shown in FIG. 1, exhaust system 220 comprises a duct 222 connected to exhaust nozzle 108. Duct 222 leads to collector/coating chamber/scrubber 224, valve 226 and pump 228. Suitable pumps comprise, for example, Leybold Model SV300 pump from Leybold Vacuum Products, Export, Pa. with a pumping capacity of about 195 cfm. An additional scrubber can be placed after pump 228, if desired. Additional valves or mass flow controllers can be used as appropriate in exhaust system 220.

Inert Gas Inlets

Generally, the reaction chamber comprises a plurality of inert gas inlets to shield components of the reaction chamber from the reaction flow. In particular, reactant inlet nozzle 106 generally has a shielding gas inlet associated with the reactant inlet, although separate shielding gas sources can be used to confine the reactant flow from reactant inlet nozzle 106. Embodiments of reactant inlet nozzle 106 and corresponding shielding gas inlets are described further below. As shown in FIG. 1, reaction chamber 100 comprises additional inert gas inlets 110, 112.

Inert gas inlets 110, 112 are associated with optical tubes 104, 106, respectively. Inert gas supplied to inert gas inlets 110, 112 help to keep the flow of compositions/particles within main chamber 102 and away from optical tubes 102, 104 such that optical components 130, 132 are contaminated less by the compositions/particles within main chamber 102. Inert gas flow from tubes 104, 106 generally does not significantly affect the flow within main chamber 102 if flows are maintained at an appropriate level greater than the diffusion rate but less than the levels that would impact the reactant flow.

Reactant Inlet Nozzles

Reaction chamber 100 comprises one or more reactant inlet nozzles 116, although generally a single reactant inlet nozzle, possibly with one or more aligned reactant inlets, generates a single reactant stream within the reaction chamber. Each reactant inlet nozzle 116 can comprise one or more reactant inlets and/or shielding gas inlets. The nozzle can be heated to inhibit condensation of vapors onto the nozzle. Furthermore, the design of reactant inlet nozzle 116 can be selected to yield desired flow patterns within main chamber 102. In particular, the size and shape of the opening of reactant inlet nozzle 116 can be selected for improved flow through the main chamber of the reactor. In addition, the structural features of reactant inlet nozzle 116 can be designed to select the flow from the nozzle to have desired characteristics. The selected structural features for reactant inlet nozzle 106 generally depend on whether or not aerosols are present in the reactant stream.

To obtain a higher reactant throughput intersecting with a radiation beam direct through the reaction chamber, the opening of the reactant inlet nozzle can be elongated along one dimension relative to the orthogonal dimension. The radiation beam is oriented along the elongated dimension to intersect with corresponding elongated reactant stream generated by the elongated inlet opening. Gas/vapor, possible with entrained aerosol, exiting an elongated nozzle generally expands along the width dimension of the nozzle. For a desired reactant throughput from the nozzle, the ability to achieve a uniform reactant velocity is controlled by nozzle design. The expansion profile away from the nozzle is similarly controlled by the nozzle design.

It is desirable for the radiation beam, e.g., a laser beam or a focused non-laser light source, to intersect to the reactant stream away from the nozzle. A radiation beam that is too close to the nozzle opening can cause the nozzle to heat up and can result in product buildup in the nozzle tip. Excessive heating of the nozzle can deteriorate the nozzle and/or result in initiation of the reaction prior to reaching the reaction zone. At the intersection of the radiation beam with the reactant stream, the radiation beam can be only slightly wider than the reactant stream to avoid wasting energy in the beam. In general, the aspect ratio and the corresponding width of the reactant inlet are selected within appropriate ranges to achieve desired uniformity of the flow, and the radiation width can be adjusted to match as long as suitable optics are available.

For substrate coating, a more uniform coating can be obtained by placing the substrate closer to the reaction zone in the vicinity of the intersection of the radiation beam with the reactant stream. The product stream from the reaction zone rapidly shrinks in length due to acceleration from a significant temperature change and molar volume change from the reaction. Depending on the velocity profile, the product stream approaches a circular stream at a sufficient distance from the reaction zone. An initially long, uniform stream of product particles can be deposited on the substrate by placing the substrate close enough to the reaction zone, although placement too close can result in excessive heating of the substrate. An appropriate distance for the substrate from the reaction zone can be selected based on composition of the product stream, the temperature profile away from the reaction zone, and the velocity of the particles and the gas in the product stream leaving the reaction zone.

For many applications, the elongated nozzle inlet is selected to have a length along the elongated dimension in the range(s) of at least about 5 centimeters, in other embodiments in the range(s) at least about 7 centimeters, in other embodiments in the range(s) at least about 10 centimeter and in further embodiments in the range(s) from about 6 centimeters to about 2 meters, to achieve desired substrate coating or particle production rates. For many embodiments, it is desirable to have a uniform reactant velocity along the elongated dimension of the inlet nozzle. Specifically, in some embodiments, the velocity at each position along the length of the inlet opening differs in magnitude from the average velocity in the range(s) of no more than about 50% of the average velocity, in other embodiment in the range(s) of no more than about 40% of the average velocity, in further embodiments in the range(s) of no more than about 30% and in still other embodiments in the range(s) no more than about 25% of the average velocity. A person of skill in the art will recognize that other ranges and subranges of nozzle inlet lengths and uniformity within these explicit ranges are contemplated and are within the present disclosure. Average velocity generally can be evaluated by a person of ordinary skill in the art, and generally involves an evaluation along the particular dimension of at least about 10 positions along the dimension.

The inlet velocity is determined by the design of the inlet nozzle and the flow rate through the nozzle. Inert gas can be added to the reactant flow to adjust the reactant velocities without changing the reactant stoichiometries or the reactant flow rates. Thus, the flow properties can be altered without correspondingly changing the particle production rate. However, the velocity can alter the stoichiometry and/or phase of the product particles as well as the product particle size.

With respect to size and shape of the opening of a reactant inlet, the dimensions of the reactant inlet and the shape of the reactant inlet can both affect the flow from the reactant inlet. In general, the reactant inlet is elongated in one dimension relative to an orthogonal dimension to make more efficient use of resources, especially the light source, and to increase production rates. The light can be propagated in a direction along the elongated inlet, although other configurations of the light source can be used to illuminate the entire reactant stream such that high production efficiencies can be achieved with high production rates.

The desired length of the reactant inlet along the elongated dimension may depend on several factors. For particle collection, the elongated length generally is selected to yield a desired production rate without significant loss of uniformity due to dissipation, which can be due to absorption, extinction or attenuation, of light transmitted through the reactant stream and with practical constraints on reactor size. For substrate coating, the elongated length of the reactant inlet is generally selected based on the dimensions of the substrate, for example, such that a length or diameter of the substrate can be coated simultaneously. In some embodiments, substrates can have dimensions of five inches or more, for example, from about 1 inch to about 20 inches, although larger and smaller substrate sizes can be used. For example, circular wafers for coating can have diameters of at least five inches in some embodiments of interest.

The width of the reactant inlet perpendicular to the elongated dimension significantly affects the reactant velocity. Narrowing the width of the inlet tends to increase the gas velocity. Changes in the gas velocity alter the properties of the product particles. Regardless of the tradeoffs in the selection of inlet size, the flow from the inlet can be stable, i.e., is not turbulent, with the appropriate inlet design. Transitional flow, which is not laminar or fully turbulent, can unstable and unpredictable. It has been found that stable flow at the nozzle results if the Reynolds number is in the range(s) of less than about 1000. Reynolds number is a dimensionless parameter equal to the density of the fluid times the velocity times a characteristic length divided by the viscosity of the fluid. The characteristic length is generally the hydrodynamic radius.

With elongated outlets, the mass flow near the ends along the elongated dimension may be somewhat less than in the center. In particular for coating applications, it may be desirable to have more uniform mass flow along the length of the inlet opening. One way to accomplish having more uniform mass flow is to has a non-rectangular shape of the inlet opening. More specifically, the end of the inlet opening can be wider than the corresponding width in the center of the inlet opening. One embodiment to achieve the larger widths at the ends of the inlets involves a bone shape inlet opening, as shown in FIG. 4. Inlet opening 170 has a curved outer edge 172 with wider sections 174, 176 compared with central region 178. The precise width dimensions can be selected to yield desired flows under the conditions for the particular reaction chamber.

Fluid dynamics computations can be performed to estimate nozzle dimensions with appropriate flow properties. To determine precise velocity contours in three-dimensional space, computational fluid dynamics was employed. Computational fluid dynamics numerically determines a solution to the governing equations of fluid dynamics: continuity, momentum and energy. For example, finite volume calculations can be used to solve Navier-Stokes equations. The solution can be exported into simple ASCII data for further calculation. In the calculations here, cross-sectional velocity data was imported into Mathematica™ for calculation of various modeling parameters, e.g. Reynolds number. The fluid dynamics calculations are used to examine the velocity of the flow within the reaction chamber after leaving the inlet. Fluid dynamics calculations are described further, for example, in Computational Fluid Dynamics, Second Edition, by J. C. Tannehill et al. (1997), Turbulence Modeling For CFD, Second Edition, by D. C. Wilcox (1998, 2000), Computational Fluid Dynamics For Engineers, by K. A. Hoffmann (1989) and Computational Fluid Dynamics, The Basics With Applications, by J. D. Anderson et al. (1995), which are incorporated herein by reference.

Figure 5:
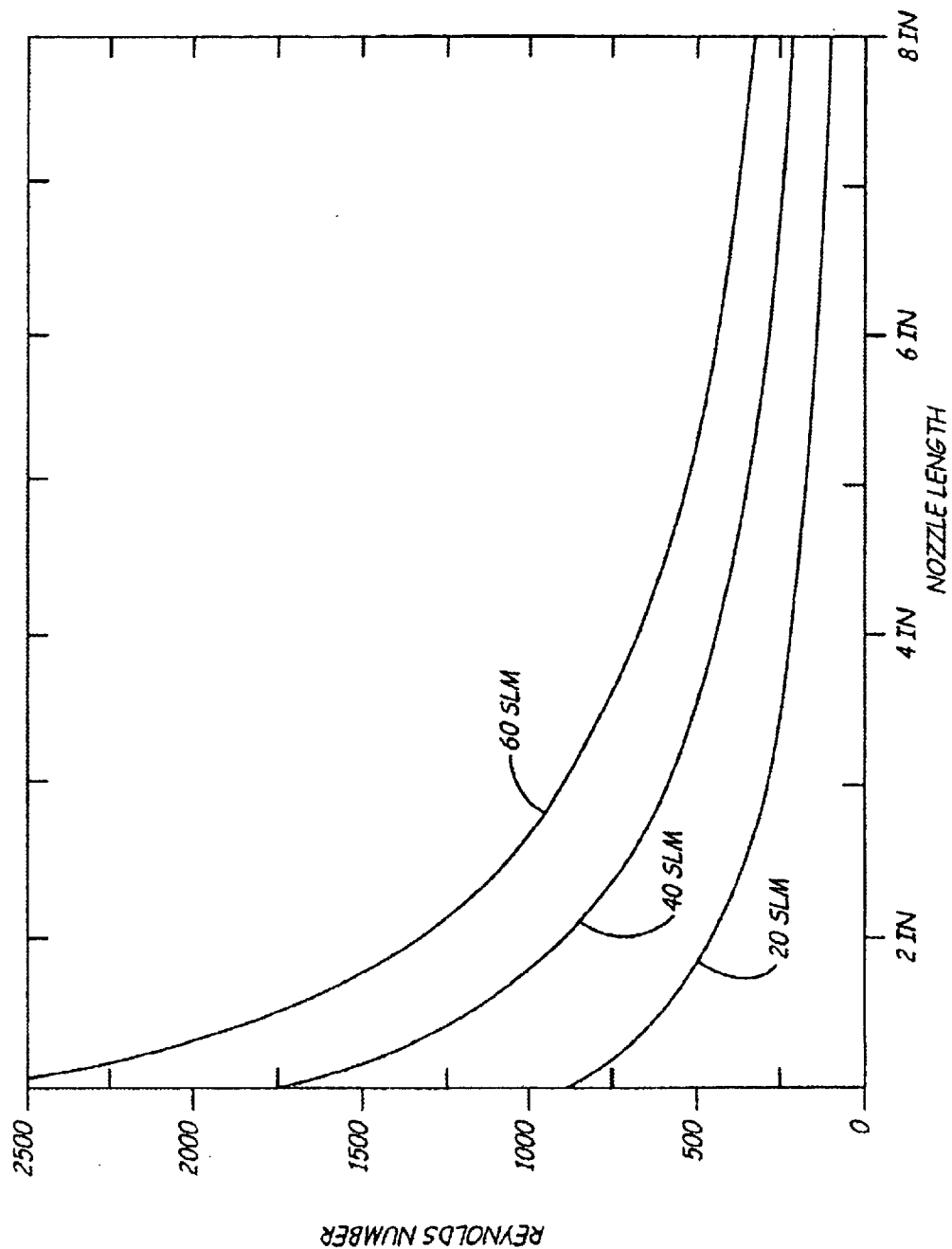
FIG. 5 is a plot of Reynolds number as a function of nozzle length for three different flow rates for an elongated, rectangular reactant inlet nozzle in a reaction chamber generally conforming to the inlet.

For the calculations, the characteristic length was chosen to be the width of the nozzle opening. Calculated Reynolds numbers for a inlet as a function of length for three flow rates in standard liters per minute (SLM) with a nozzle width of 0.110 inch is plotted in FIG. 5. Stable laminar flow is obtained at a 20 SLM flow rate for all nozzle lengths greater than about 1 inch. At higher flow rates, stable flow with Reynolds numbers below 1000 are only obtained with longer inlets, about 1.8 inches for a 40 SLM flow and about 2.8 inches for a 60 SLM flow.

Figure 6:
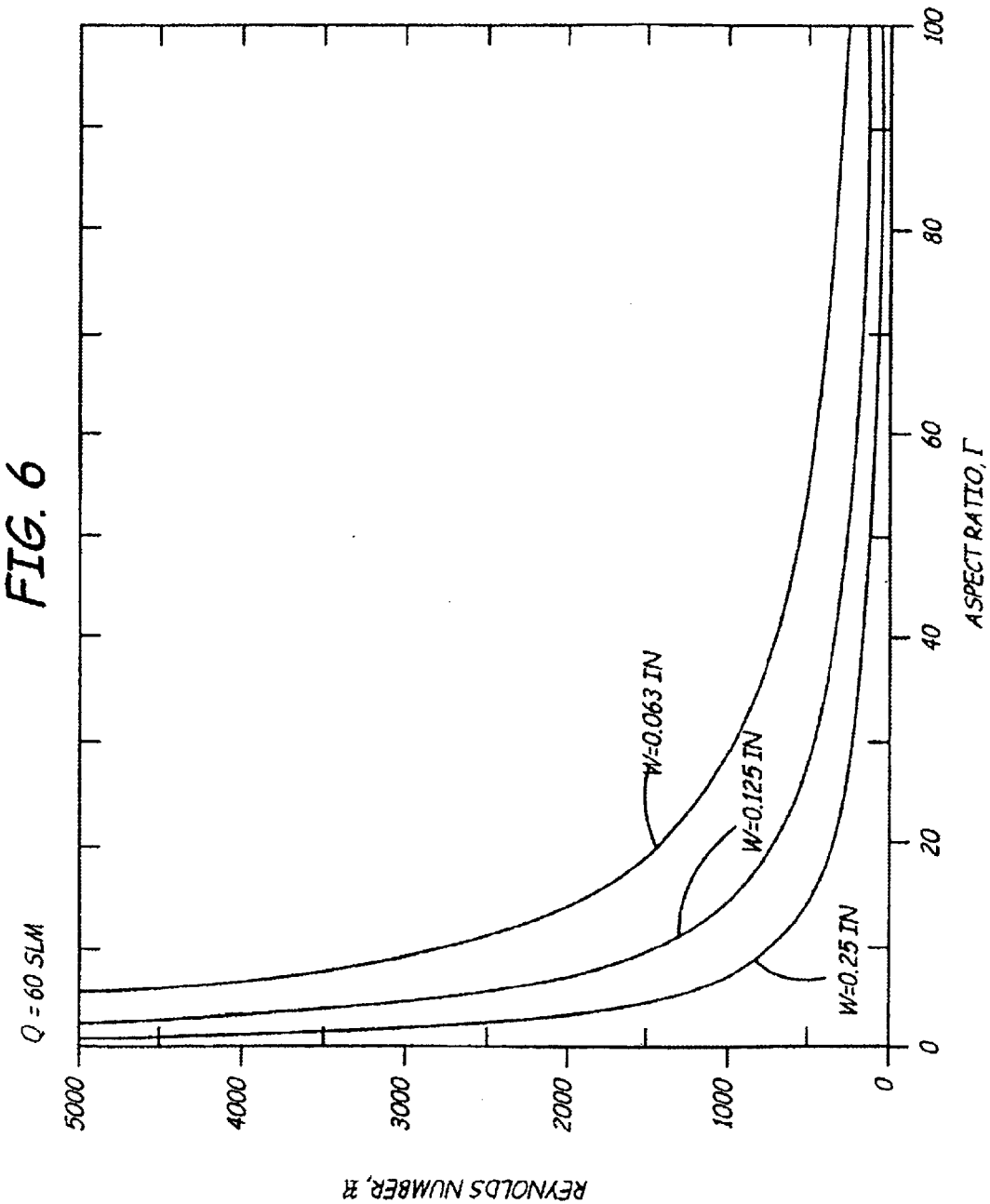
FIG. 6 is a plot of Reynolds number as a function of reactant inlet nozzle aspect ratio for three inlet widths.

The Reynolds number is inversely related to the aspect ratio of a rectangular inlet, where the aspect ratio is the ratio of the inlet length divided by the inlet width. The Reynolds number as a function of aspect ratio is plotted in FIG. 6 for a flow rate of 60 SLM and three inlet widths. Thus, if the aspect ratio is higher, the flow is more stable. In other words, the flow is more stable if the reactant inlet is elongated a greater amount and if the reactant inlet is narrower. It has been discovered that particularly suitable flow is obtained with very large aspect ratios. For these improved embodiments, the aspect ratio is in the range(s) of at least about 60, in other embodiments in the range(s) of at least about 90 and in further embodiments in the range(s) from about 120 to about 400. A person of ordinary skill in the art will recognize that other ranges and subranges of aspect ratios within these ranges are also contemplated and are within the present scope of the disclosure.

Figure 7:
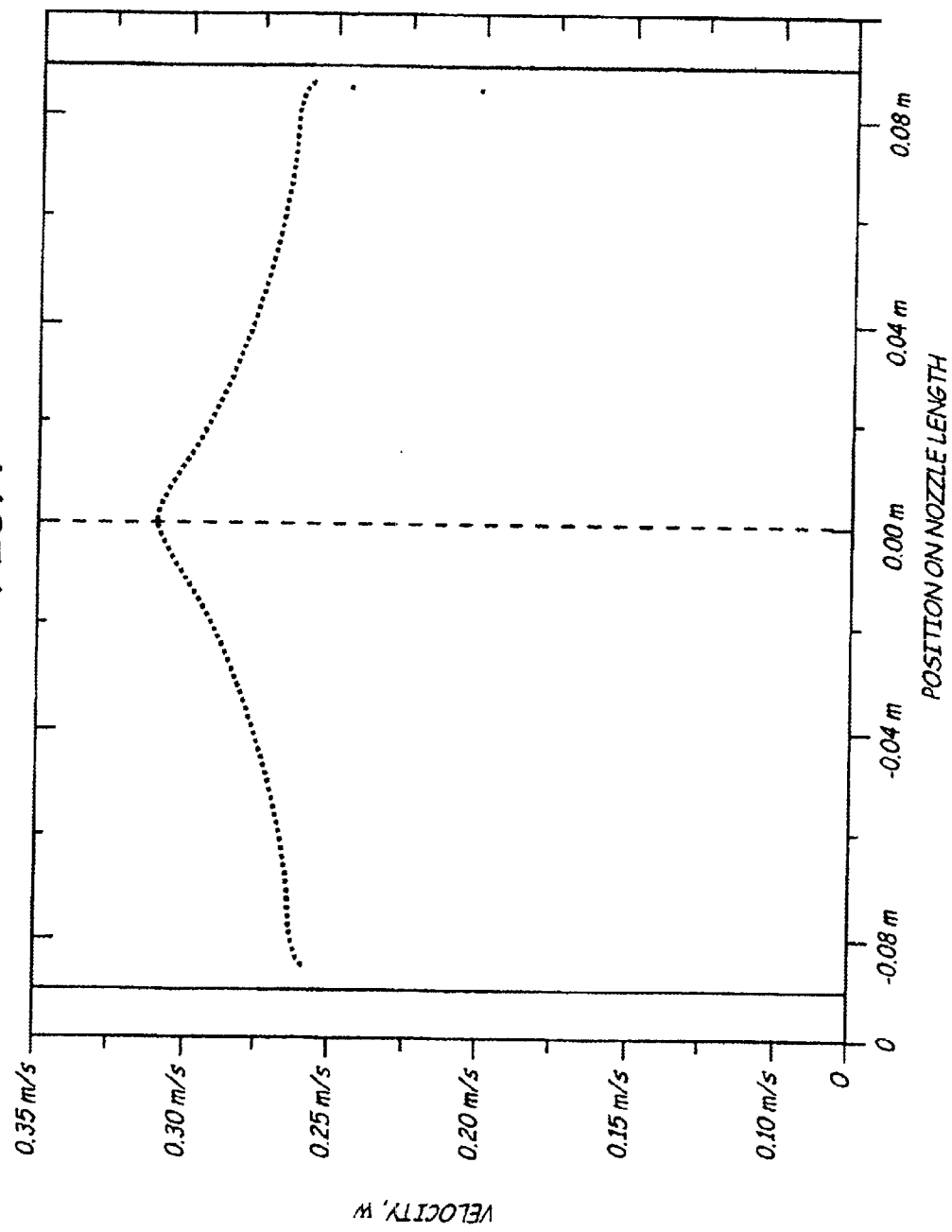
FIG. 7 is a plot of flow velocity leaving the reactant inlet nozzle for one aspect ratio of the nozzle, the plot being as a function of distance from the center of the inlet along the elongated dimension of an elongated reactant inlet nozzle, the vertical solid lines indicating the edges of the nozzle.
Figure 8:
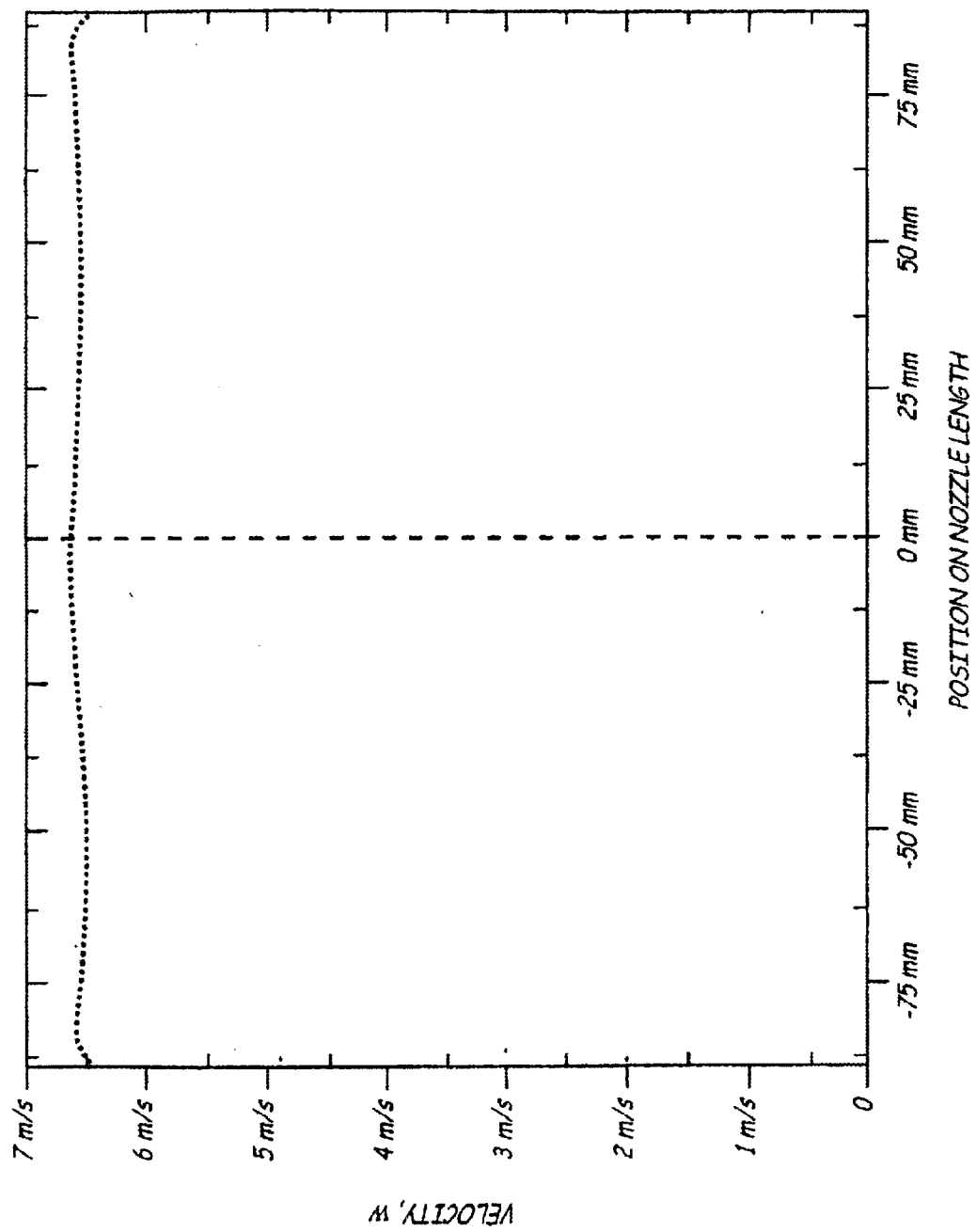
FIG. 8 is a plot of flow velocity leaving the reactant inlet nozzle for another aspect ratio of the nozzle, the plot being as a function of distance from the center of the inlet along the elongated dimension of an elongated reactant inlet nozzle, the vertical edges of the plot indicating the edges of the nozzle.

For a rectangular nozzle, fluid dynamic computations can be used to estimate the gas velocity along the length of the inlet. Muzzle velocity as a function of position along the inlet is plotted in FIG. 7 for a 90 millimeter (mm) inlet with a width of 3 mm with a flow rate of 20 standard liters per minute (slm) an inlet gas velocity of 1 m/s and $\sigma/\overline{w}=5.0862\%$, where $\sigma$ is the standard deviation of the velocity and $\overline{w}$ is the average gas velocity. The velocity is highest at the center of the inlet and drops off gradually until the ends of the inlet at which the velocity drops off rapidly. Similar results are presented in FIG. 8 for an aspect ratio of 90 corresponding to a length of 90 mm and a width of 1 mm. The velocity profile in FIG. 8 is significantly flatter than the corresponding velocity profile in FIG. 7. The importance of the aspect ratio for obtaining a uniform velocity from the nozzle can be seen in the plots in FIGS. 7 and 8. If the aspect ratio is larger, the flow is more one dimensional rather than like flow from a pipe, which is parabolic.

Figure 9:
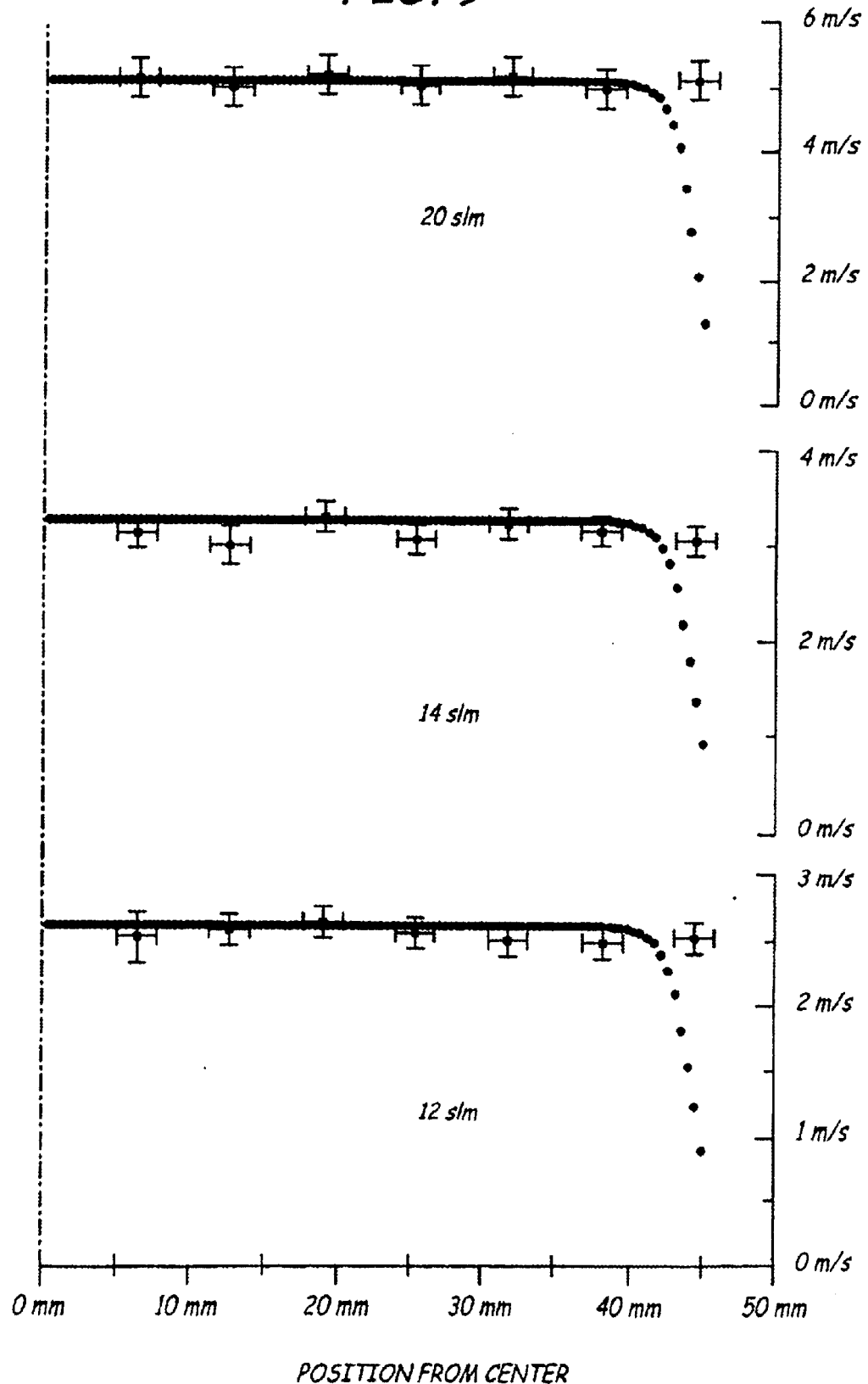
FIG. 9 is a plot of measured (dots with error bars) and computed (dot patterns) flow velocity as a function of distance from the center of the reactant inlet nozzle along the elongated dimension of an elongated nozzle.

Also, actual velocity profile measurements were obtained with three different inlet nozzles. The probe was a hot wire anemometer from TSI Inc., Minneapolis, Minn. The hot wire probe is part of a thermal amemometry-system that obtains velocity measurements by heat transfer. The first nozzle had a width of 3 mm and a length of 90 mm. For the first nozzle, calculations and experiments were both performed for comparison. The chamber pressure was 150 torr. Measurements were obtained for three flow rates. The calculated and measured velocity profiles are plotted in FIG. 9. For all three flow rates (12 SLM, 14 SLM and 20 SLM), the measured velocity profiles were essentially equal to the computed values. These results confirm the validity of the computational fluid dynamics results.

Figure 10:
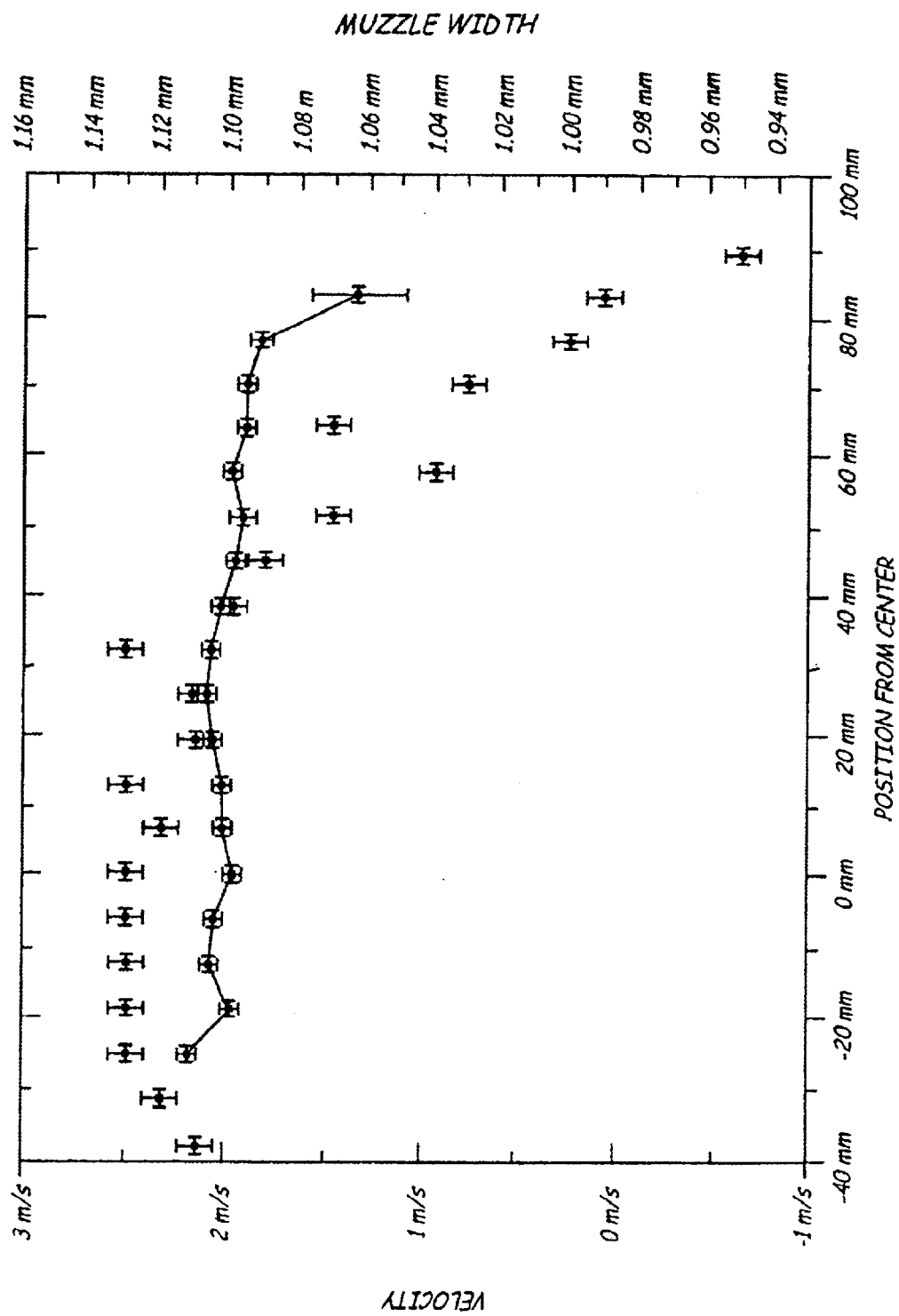
FIG. 10 is a plot of flow velocity (connected dots) and nozzle width (unconnected dots) as a function of position from the center of the inlet for an elongated nozzle with a non-rectangular inlet opening

The second nozzle had a non-rectangular shape with a wider width in the center of the nozzle. A plot of the measured velocity profile and the measured inlet widths are shown in FIG. 10 as a function of position along the nozzle length from the center of the nozzle. The connected dots indicate the velocity profile, and the unconnected dots indicate the widths. The flow rate was 50 SLM and the chamber pressure was 350 torr. The final velocity measurements near the edge of the nozzle and at about 96 mm from the center of the nozzle indicate that the jet starts to shed. These measurements indicate the useful width of the jet. The error bars indicate 1.27 mm in the x dimension, one standard deviation for the velocity and 0.005 mm for the width.

Figure 11:
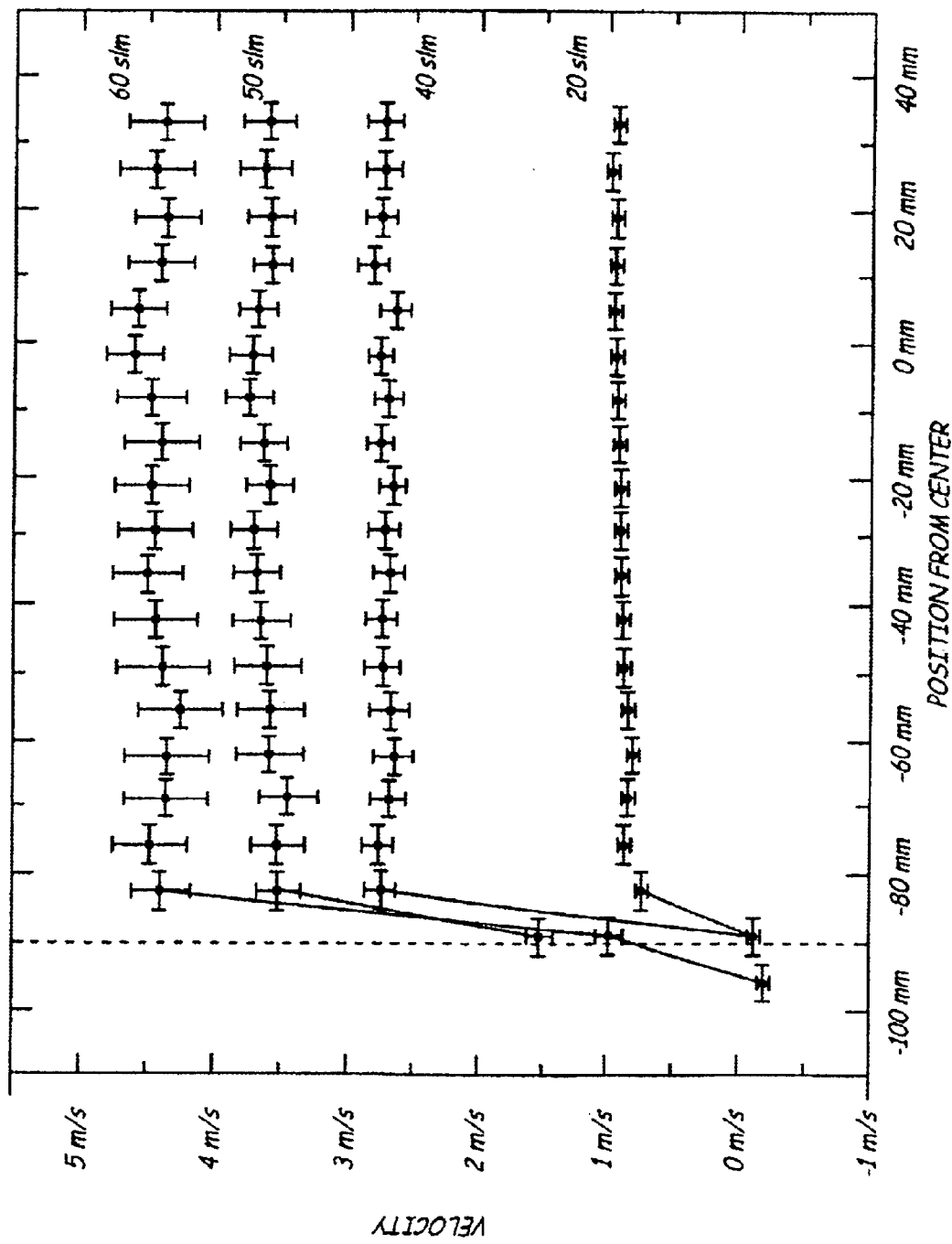
FIG. 11 is a plot of flow velocity as a function of distance from the center of another embodiment of an elongated reactant inlet nozzle with a 2-millimeter width for flow rates of 20 SLM, 40 SLM, 50 SLM and 60 SLM.
Figure 12:
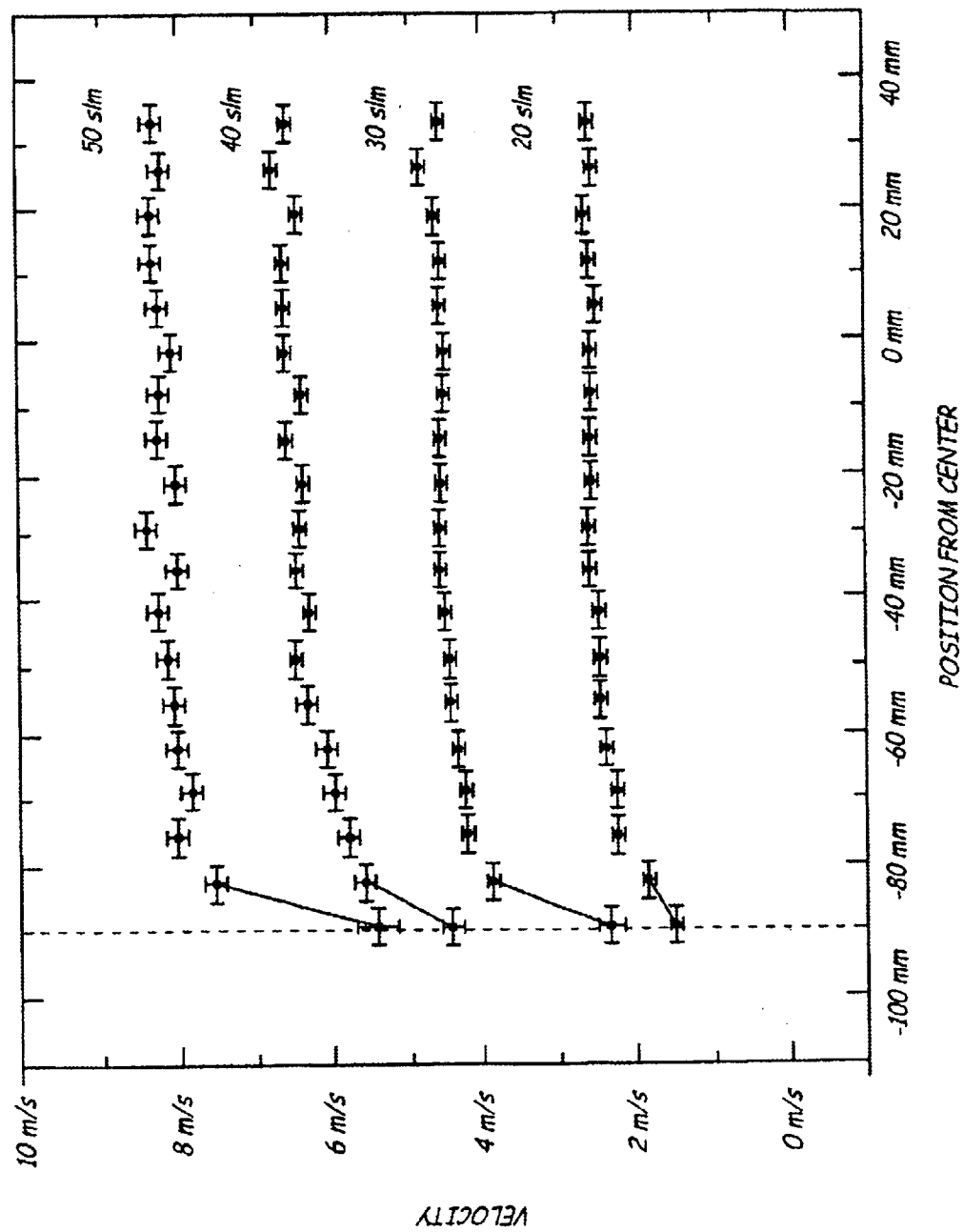
FIG. 12 is a plot of flow velocity as a function of distance from the center of the elongated reactant nozzle of FIG. 11 with a 1-millimeter width for flow rates of 20 SLM, 30 SLM, 40 SLM and 50 SLM.

Velocity profile measurements were obtained with another nozzle, described further below, with adjustable inlet dimensions. The nozzle had a length of 179 mm and a width of either 2 mm (FIG. 11) or 1 mm (FIG. 12). The chamber pressures were 350 torr. Error bars indicate 2.72 mm in the position from center and one standard deviation in the velocity measurements. The edge of the nozzle is indicated with a dashed line. The velocity profiles are all relatively flat with some drop at the edge of the inlet.

In general, flow into the nozzle of vapor/gaseous reactants can be controlled through the use of a throat baffle within the interior of the nozzle. Specifically, a throat baffle can be used to increase flow along the edges of the nozzle relative to the center of the nozzle to make the flow more uniform along the extended length of the nozzle. Since the inlet in some embodiments is elongated along one dimension, the throat baffle has a similar elongated shape. The throat baffle provides a pressure drop in the flow path that tends to more uniformly distribute gas flow at the downstream or outlet end of the reactant flow. It may be further shaped to compensate for flow resistance in the reactant inlet. By tuning the pressure drop, a desired uniform or non-uniform velocity profile can be achieved for a particular application. The tuning of the pressure drop can account for the mass flux.

Figure 13:
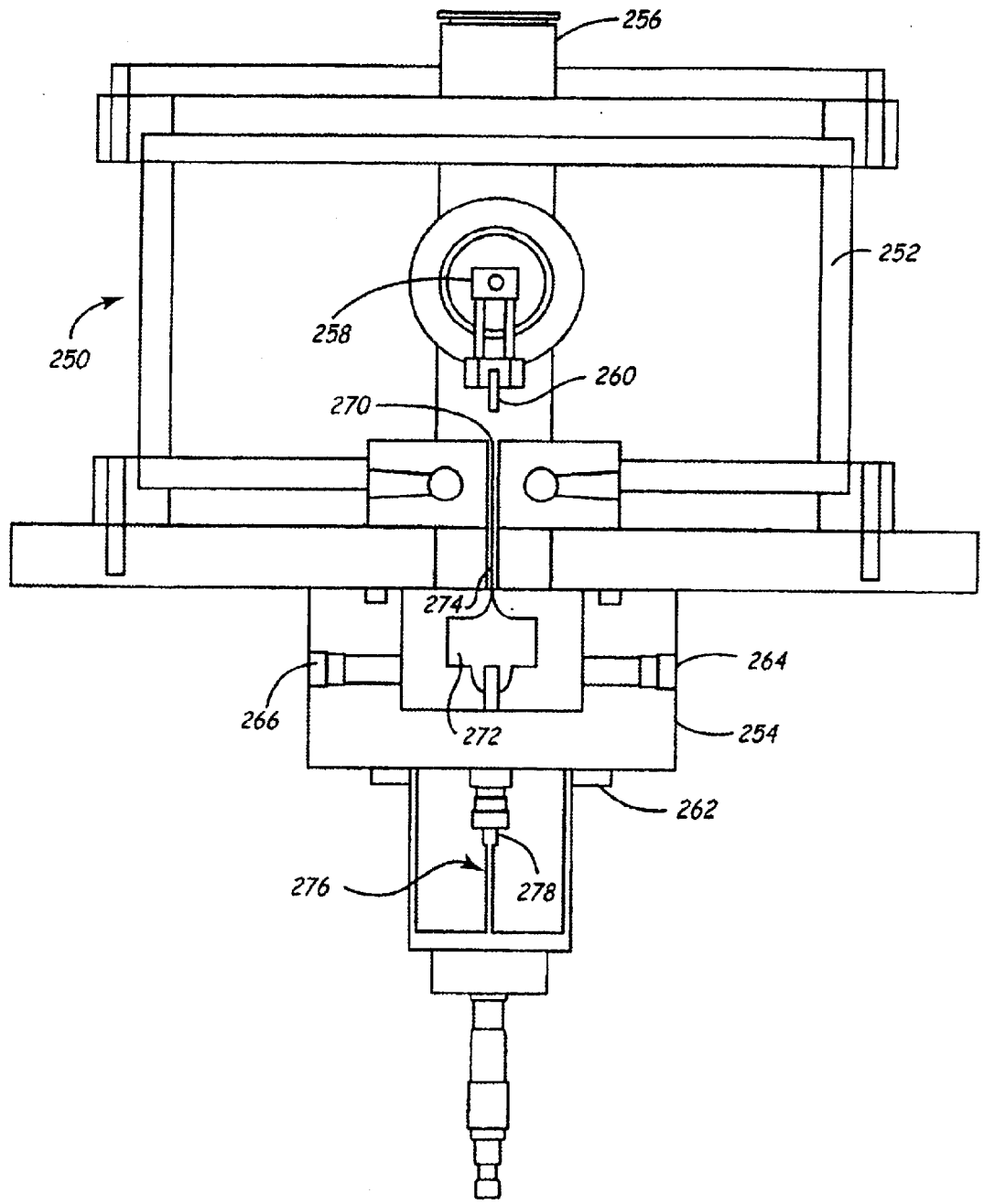
FIG. 13 is a sectional side view of a reaction chamber with a reactant inlet nozzle in the reactant delivery system comprising a throat baffle within the inlet nozzle, wherein the section is taken through the center of the chamber.

A reaction chamber with an elongated reactant inlet and a throat baffle is shown in FIG. 13. The view in FIG. 13 is a sectional view taken through the width of the elongated inlet with the inlet being elongated along the direction in and out of the plane of the figure. Reaction system 250 has a main chamber 252, reactant delivery system 254 and exhaust nozzle 256. Main chamber 252 comprises an arm 258 for supporting a hot wire probe 260, which extends along the elongated length of the inlet.

Reactant delivery system 254 comprises a feed chamber 262 into which gas/vapor flows, for example, through conduits 264, 266. Elongated inlet 270 connects feed chamber 260 with the interior of main chamber 252. Throat baffle 272 is located at the entrance 274 from feed chamber 260 into elongated inlet 270. In some embodiments, throat baffle 272 is connected with a rod 278 to actuator 276 that controls the height of throat baffle 272 relative to elongated inlet 270. Actuator 276 comprises a motor that controls the position of rod 278. A fragmentary close-up view of throat baffle 272 and elongated inlet 270 is shown in FIG. 14.

A perspective view of throat baffle 272 is shown in FIG. 15. Throat baffle 272 has a base 280 and a projecting section 282. When mounted in the reaction chamber, projecting section 282 extends into elongated inlet 270. Both base 280 and projecting section 282 are elongated almost the same extent as elongated inlet 270 such that projecting section 282 can extend into elongated inlet 270 along approximately the entire length of the elongated dimension of inlet 270. Projecting section 282 can have different shapes to affect the flow in corresponding ways. Different shaped projecting sections 284, 286, 288 are shown in FIGS. 16A–16C, respectively. In alternative embodiments, throat baffle 290 has only a base section and no projecting section, as shown in FIG. 16D. In other alternative embodiments, throat baffle 292 comprises a trough 294 in place of place of a projecting section, as shown in FIG. 16E. Selection of the shape may be desirable to have an appropriate shape for a particular flow rate. For example, at low rates a smaller gap may be desired.

Figures 17, 18:
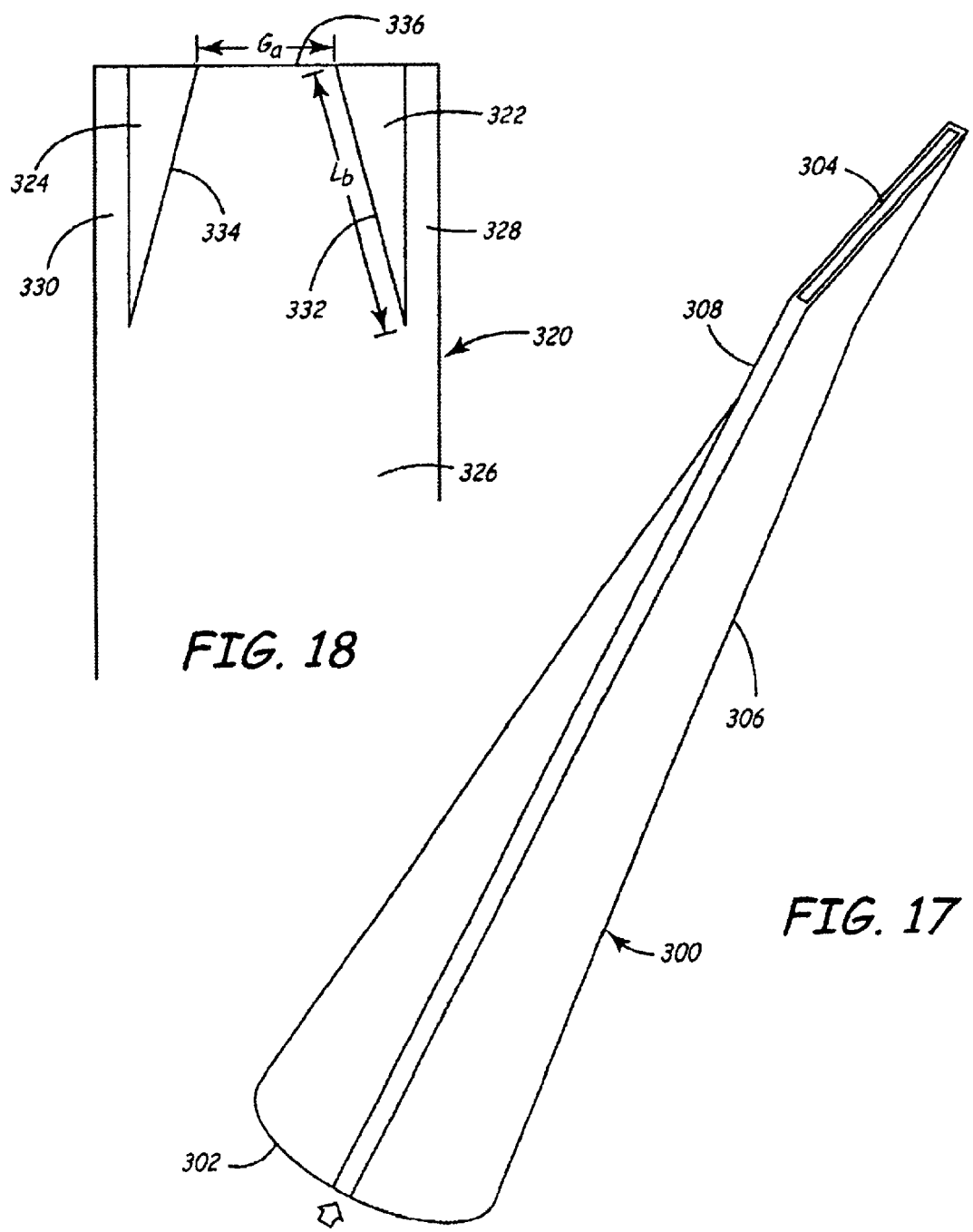
FIG. 17 is a perspective view of an ambi-hyperbolic collimator for the delivery of aerosol reactants into a reaction chamber.
FIG. 18 is a sectional side view of a reactant inlet nozzle with boundary-layer tripping velocity uniformers.

For aerosol delivery into the reaction chamber, shaping the aerosol to conform to the shape of the elongated inlet, while maintaining uniformity of the flow, poses another issue. To collimate and shape the aerosol droplets, an ambi-hyperbolic collimator 300 can be used, as shown in FIG. 17. Collimator 300 comprises an entrance 302 that is generally circular or elliptical in shape and that generally matches the cross-section of the aerosol plume generator. Collimator 300 has an exit 304, which generally is approximately rectangular. Observed from a side view along the elongated dimension of exit 304, collimator 300 has an approximately hyperbolic profile 306. Similarly, collimator 300 observed along a direction perpendicular to the elongated dimension of exit 304 has a second approximately hyperbolic profile 308.

Entrance 302 is placed such that aerosol from an aerosol generator is directed into entrance 302, as noted with the arrow in FIG. 17. Entrance 302 has an appropriate size based on the characteristics of the aerosol generator. Exit 304 forms an inlet of the reactant inlet nozzle and may be one of a plurality of reactant inlets of the reactant inlet nozzle that directs aerosol and desired gases/vapors into the reaction chamber. Exit 304 has dimensions suitable given the other parameter of the reaction chamber and desired flow rates for reactant delivery.

In other embodiments with aerosol and/or vapor reactants, a flow can be directed to a baffle in the form of boundary-layer tripping velocity uniformers with wedges projecting into the flow on either side of the elongated dimension within the nozzle. The wedges form voids, termed a baffle gap, between the wedges and the channel wall that produce a back pressure. This back pressure causes flow adjacent the wedges to speed-up. The speed-up along the wedges counters the establishment of normal laminar flow along the edges of the nozzle. Normal laminar flow would lead to enhanced non-uniformity of the flow velocity along the elongated length of the inlet.

Figure 19:
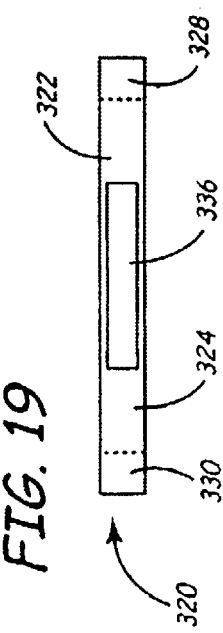
FIG. 19 is a top view of the reactant inlet nozzle of FIG. 18.

An embodiment of a boundary-layer tripping velocity uniformer is shown in FIGS. 18 and 19. Nozzle 320 comprises baffles 322, 324 extending into main channel 326 within the interior of nozzle 320. Baffles 322,324 form baffle gaps 328, 330, which have dead volume creating a corresponding blocked flow. Interior surfaces 332, 334 of baffles 322, 324 can be slanted to further the speed-up of the flow velocity adjacent the surfaces 332, 334 such that a more uniform flow is established. In some embodiments, interior surfaces 332, 334 are at an angle in the range(s) of less than about 15° relative to the normal and in other embodiments in the range(s) of less than about 12°, which helps to prevent flow separation and turbulence. The opening at the end of nozzle 320 forms reactant inlet 336.

Figure 20:
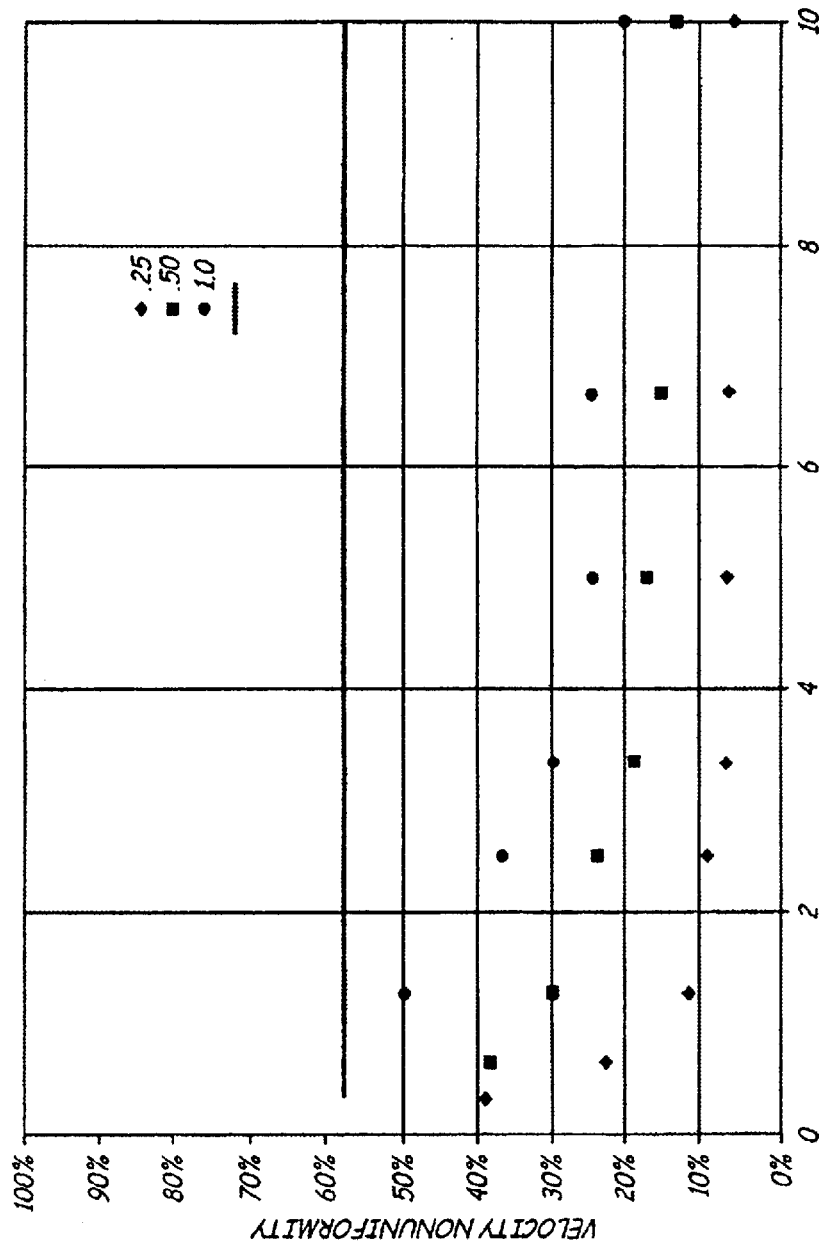
FIG. 20 is a plot of velocity non-uniformity as a function of baffle parameter for three different values of baffle gap compared with the velocity non-uniformity (solid line) for a nozzle with the same dimensions but without a baffle.

Finite volume calculations were performed to estimate the flow within nozzle 320. Velocity non-uniformity was evaluated from the calculations for a rectangular nozzle as a function of baffle parameter ($\Phi$) for three values of the aerosol gap and for a circular cross section tube for comparison. The baffle parameter is defined as the ratio of the baffle length ($L_b$) divided by the aerosol gap ($G_a$) (i.e., the nozzle opening width), as shown in FIG. 18. The velocity non-uniformity is defined as the difference between the average aerosol velocity at the centerline of the aerosol gap (V(cl)) and the average velocity 0.005 inches from the edge/boundary ($\delta$) at reactant inlet 336 (V($\delta$-0.005")) divided by the sum of V(cl) and V($\delta$-0.005"), i.e., velocity nonuniformity=(V(cl)−V($\delta$-0.005"))/(V(cl)+V($\delta$-0.005")). Plots of the velocity non-uniformity values are plotted in FIG. 20. As seen in FIG. 20, significantly improved uniformity in velocity can be obtained by increasing the aerosol baffle parameter and by decreasing the aerosol gap.

Figure 21A:
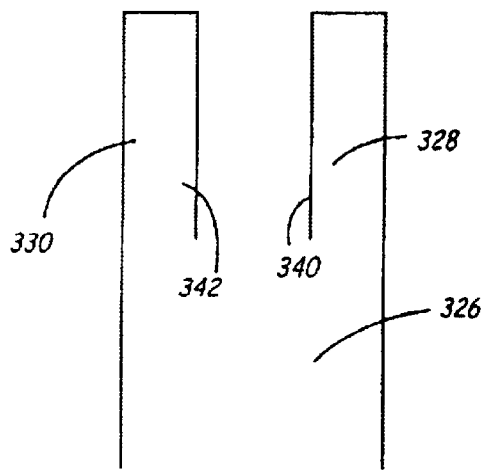
FIG. 21A is a sectional side view of a reactant inlet nozzle with boundary-layer tripping velocity uniformers with an alternative embodiment of the baffle comprising a rectangular cross-sectional shape.
Figure 21B:
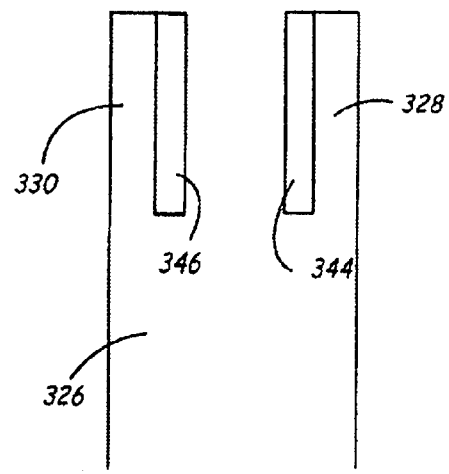
FIG. 21B is a sectional side view of a reactant inlet nozzle with boundary-layer tripping velocity uniformers with an alternative embodiment of the baffle comprising a sheet shape.
Figure 21C:
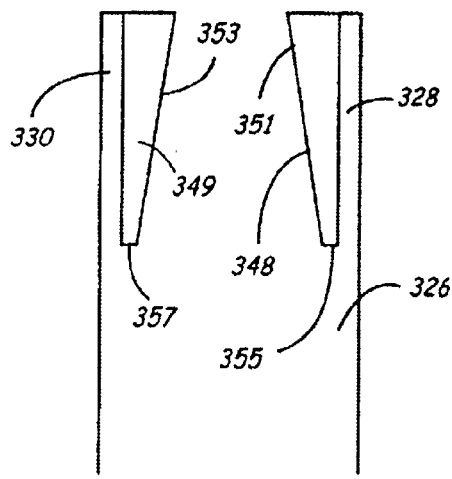
FIG. 21C is a sectional side view of a reactant inlet nozzle with boundary-layer tripping velocity uniformers with an alternative embodiment of the baffle comprising a sloped edge.
Figure 21D:
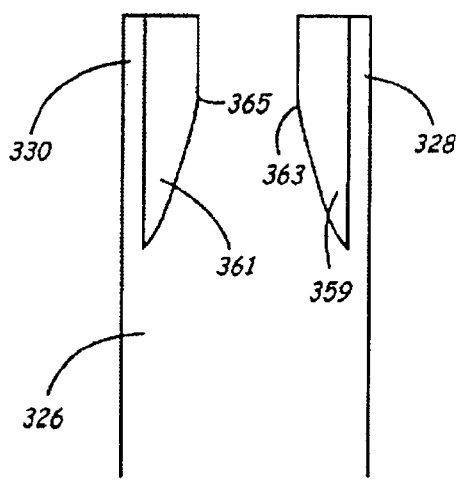
FIG. 21D is a sectional side view of a reactant inlet nozzle with boundary-layer tripping velocity uniformers with an alternative embodiment of the baffle comprising a curved surface.

The desired baffle gap can be established with other baffle shapes besides wedges, although wedges can provide desirable velocity increases along the walls of the baffle. For these different shapes the top view in FIG. 19 is the same. Side views of a representative sampling of other possible shapes are shown in FIGS. 21A–21D. Referring to FIG. 21A, baffles 340, 342 extend within main channel. Baffles 340, 342 has a sheet shape. Baffles 340, 342 form baffle gaps 328, 330. Referring to FIG. 21B, baffles 344, 346 have a rectangular cross section. In an alternative embodiment, baffles 348, 349 has a truncated wedge shape with sloped sides 351, 353 and ledges 355, 357, respectively, as shown in FIG. 21C. In addition, baffles 359, 361 can comprise curved surfaces 363, 365, as shown in FIG. 21D.

In some embodiments, the reactant inlet nozzle comprises a plurality of inlet openings. In particular, the reactant inlet nozzle generally comprises one or more shielding gas inlets along with a reactant delivery inlet The shielding gas inlets are used to deliver inert gas to help to confine the reactant stream. However, the inlet nozzle can further comprise a plurality of inlets for the delivery of multiple reactants. Similarly, one or more reactants can be mixed with the shielding/inert gas for delivery with the shielding gas such that some mixing occurs in the chamber to provide a suitable complete mix of reactants. In some of these embodiments, an aerosol can be delivered with gas through one or more openings while gaseous reactants and/or shielding gases can be delivered through other openings. Generally, each of the plurality of openings is elongated approximately the same amount along the same direction that generally follows a light beam path.

In one embodiment, shown in FIG. 22, inlet nozzle 350 has a central inlet 352 and two side inlets 354, 356. Inlets 352, 354, 356 lead to corresponding channels 358, 360, 362 within nozzle 350. In some embodiments, central inlet 352 can be used for the delivery of an aerosol within a gas/vapor flow while inlets 354, 356 can be used for the delivery of one or more gaseous/vapor reactants, inert shielding gas, or combinations thereof.

Another embodiment of an inlet nozzle with multiple inlets is shown in FIG. 23. Inlet nozzle 370 has a central inlet 372 and four side inlets 374, 376, 378, 380. Inlets 372, 374, 376, 378, 380 lead to corresponding channels 382, 384, 386, 388, 390 within nozzle 370. Inlets 372, 374, 376, 378, 380 can be used for the delivery of aerosol reactants, gas/vapor reactants, inert gases and other compounds to influence the reaction. Generally, the flow is symmetric such that the flow from inlet 376 is the same as the flow from inlet 380, and the flow from inlet 378 is the same as the flow from inlet 374. The flow from outer inlets 376, 380 generally is all or a significant fraction inert gas.

Figure 24:
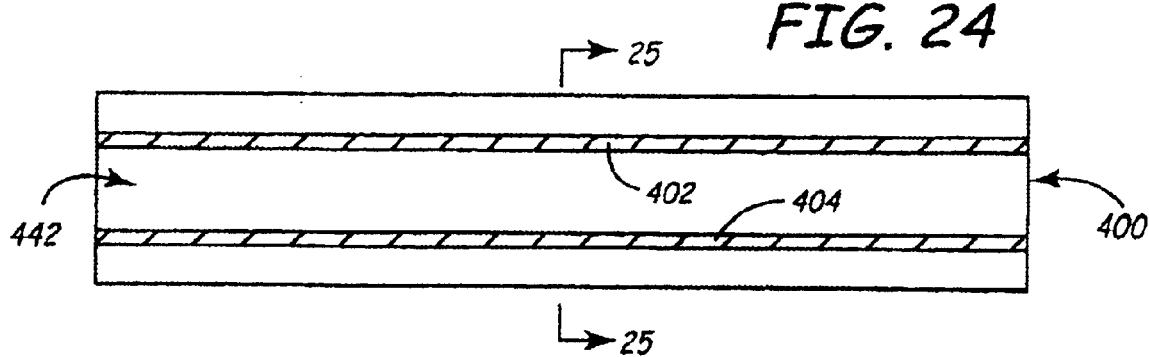
FIG. 24 is a top view of a reaction chamber with a plurality of reactant inlets and sloping reaction chamber walls.
Figure 25:
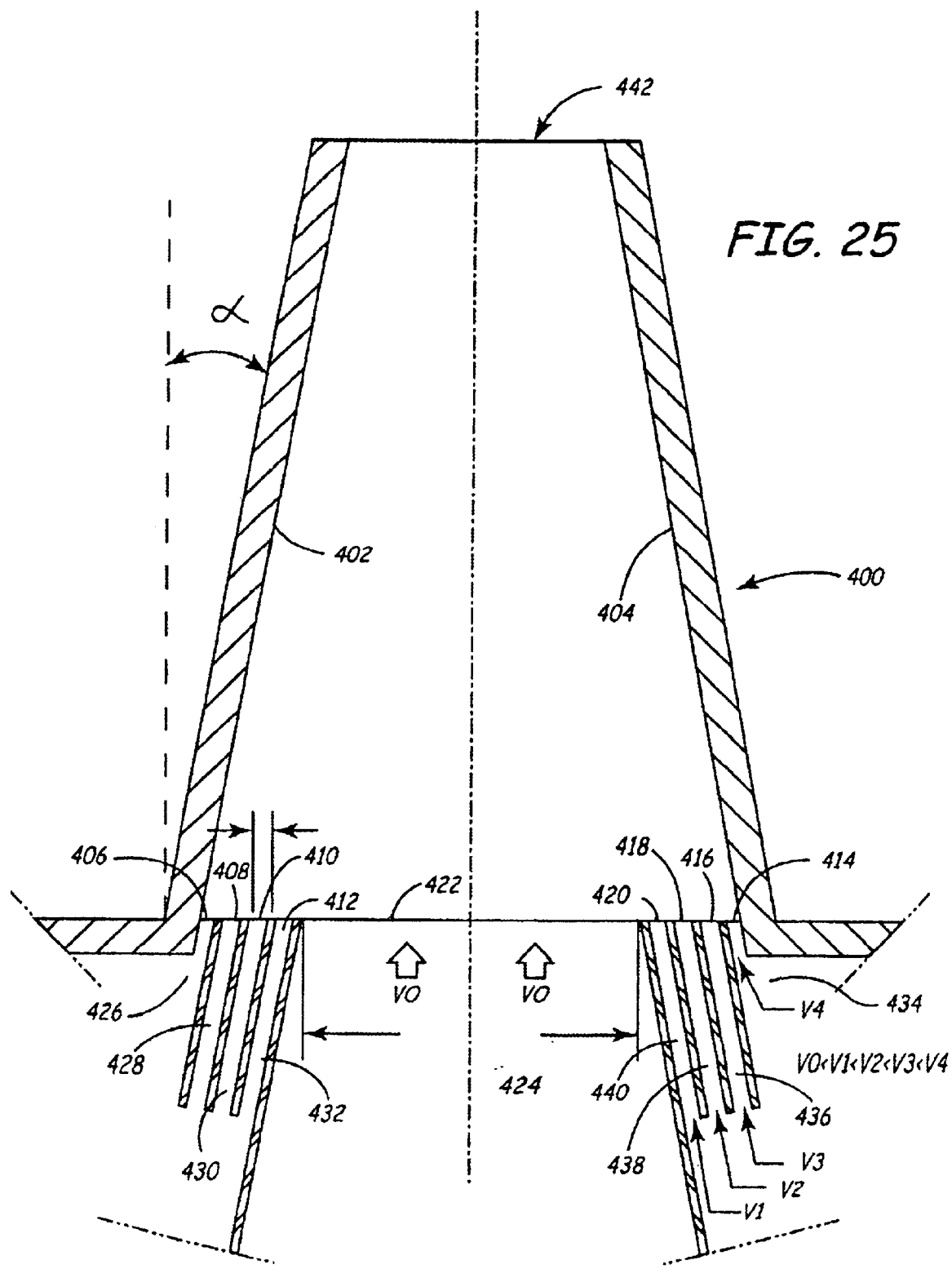
FIG. 25 is a sectional view of the reaction chamber in FIG. 24 taken along line 25—25 of FIG. 24.

A particularly versatile embodiment of a reactant inlet nozzle with a plurality of inlets is shown in FIGS. 24 and 25. The shape of main chamber 400 is configured to maintain high flow rates adjacent chamber walls 402, 404. Specifically, walls 402, 404 along the elongated chamber direction are placed at an angle a relative to the normal. Angle a generally can take any convenient value with the velocities in the multiple inlets adjusted to prevent separation of the flow at higher angles. Nevertheless, in some embodiments, it is convenient to have angle a in ranges from about 2° to about 30°. While the angled walls are shown with planar surfaces, the walls can be curved while producing a similar narrowing of the chamber width with increasing distance from the reactant inlet nozzle. A plurality of auxiliary inlets 406, 408, 410, 412, 414, 416, 418, 420 are placed symmetrically on the sides of a central reactant inlet 422. Separate plenums 424, 426, 428, 430, 432, 434, 436, 438, 440 lead to central reactant inlet 422 and auxiliary inlets 406–420. Outlet 442 leads to a collection system, a coating chamber or combinations thereof.

As shown in FIG. 25, four inlets are located on each side of central reactant inlet 422. Alternatively, two inlets, three inlets or more than four inlets can be placed on either side of the central reactant inlet. Generally, auxiliary inlets 406–420 are placed symmetrically about central reactant inlet 422, although non-symmetrical configurations can also be used. The gaps at the openings forming auxiliary inlets 406–420 do not need to be all the same, although the gaps are generally smaller than the dimensions of central reactant inlet 422. The inlets adjacent the walls (inlets 406, 414 as shown in the embodiment of FIG. 25) generally are connected to an inert gas supply such that inert gas is delivered adjacent the walls. Alternatively, or in addition, inlets adjacent the walls or other inlets adjacent reactant delivery inlets can comprise cooling gases that can be compounds with high thermal conductivity, such as He and $H_2$, or high heat capacity, such as $CO_2$. The other auxiliary inlets can be connected to an inert gas supply, a reactant supply or a combination of the two. If auxiliary inlets supply reactants, they mix with the reactants from the central reactant inlet within the main chamber.

The back pressures leading to the respective inlets can be adjusted to produce flows from the inlets with velocities that increase successively moving from the central inlet toward the chamber walls. Thus, as indicated in FIG. 25, the velocity from central reactant inlet 422 ($v_0$) is less than the velocity firm inlets 412, 420 ($v_1$), which is less than the velocity from inlets 410, 418 ($v_2$), which is less than the velocity from inlets 408, 416 ($v_3$), which is less than the velocity from inlet 406, 414 ($v_4$), i.e., $v_0<v_1<v_2<v_3<v_4$. This use of multiple auxiliary inlets and gradient in velocity distribution is predicted to result in a significant reduction in product deposition on the chamber walls with reduced volumes of inert gas.

The use of multiple auxiliary inlets and angled chamber walls removes dead volume that can develop between a single inert gas sheet and vertical chamber walls. The dead volume can result in a recirculating cell that leads to wall contamination with deposited product particles, which can result in lost product. Also, heat from particle synthesis accelerates the center of the flow pulling in the shielding gas toward the center of the chamber and increasing the dead volume and corresponding recirculation. The design in FIGS. 24 and 25 fill up the dead volume with flow. Since the outer flow has an increased velocity, this inert gas flow sweeps the walls clean continuously.

To increase uniformity across inlets, a flow straightening grid can be placed within the inlet to provide a pressure drop to distribute the flow across the major axis, i.e., elongated direction, of the elongated inlet. A flow straightening grid can also be used for shielding gas delivery to reduce consumption of shielding gas by the efficient delivery of the shielding gas The flow straightening grid provides a divided pathway from a single plenum to break the flow into a plurality of smaller flows.

The principle of the flow grid nozzle is shown in FIG. 26. A standard nozzle 450 is shown in FIG. 26A and a corresponding flow grid nozzle 452 is shown in FIG. 26B. Flow grid nozzle 452 comprises a grid with a plurality of channels 454 that divide the flow. The division of the flow due to channels 454 results in a narrower spread of velocities such that a more uniform flow is obtained. The velocity profiles from the respective nozzle are shown schematically by velocity vectors 456, 458 shown above nozzles 450, 452, respectively.

An embodiment of a reactant inlet nozzle with a flow grid is shown in FIGS. 27–30. In this embodiment, reactant inlet nozzle 458 has a shielding gas inlet 460 surrounding a reactant inlet 462. In this particular embodiment, the flow grid forms a two dimensional lattice, 464, 466, respectively, within each inlet 460, 462 of nozzle 458. As shown in FIGS. 27–30, the two dimensional lattice is in a roughly rectangular grid. However, other shapes can be used for the grid elements, such as hexagonal shapes, other geometrical shapes, random shapes, a distribution of sizes to tailor the flow or combination of shapes and/or sizes. Generally, the size and shape of the grid elements are selected to yield the desired pressure drop across the grid.

Generally, a single plenum feeds each grid. For example, plenums 470, 472 lead to grids 464, 466, respectively. A plurality of reactant inlets can be used wherein each reactant inlet has a separate flow grid.

Figure 27:
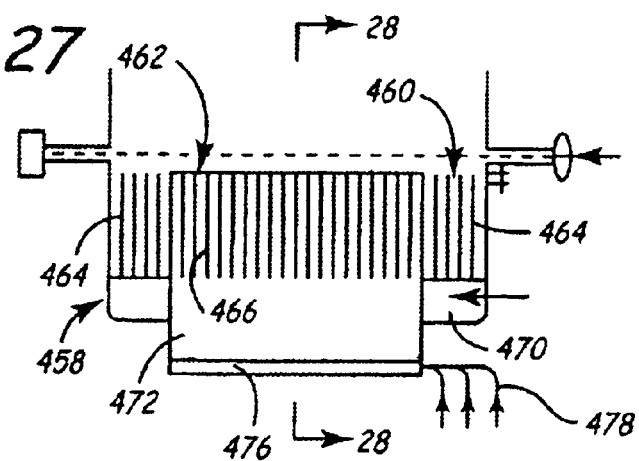
FIG. 27 is a sectional view of a reaction chamber with flow grids for reactant delivery and shielding gas delivery, in which the cross section is taken through the light beam path.
Figure 28:
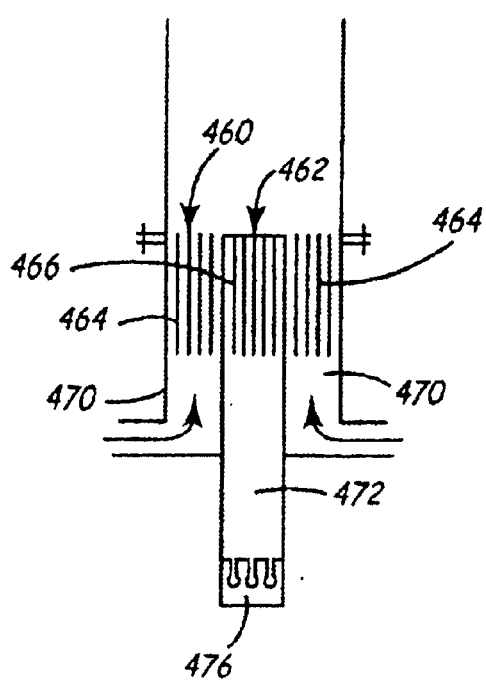
FIG. 28 is a sectional view of the reaction chamber in FIG. 27 taken along line 28—28.
Figure 29:
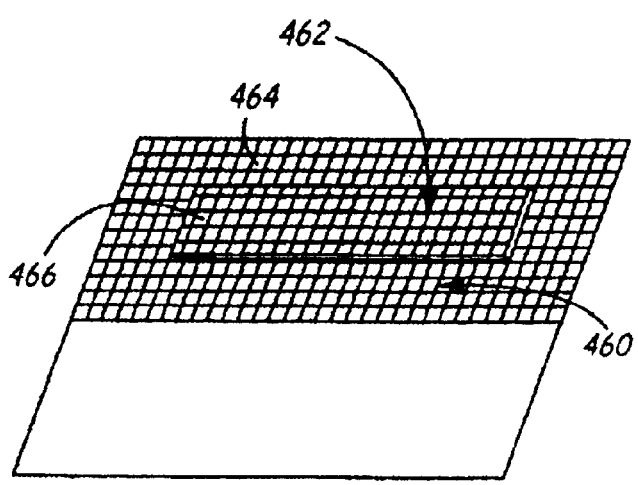
FIG. 29 is a schematic top view of the reaction chamber of FIG. 27.

For reactant delivery, a particular configuration is shown in FIGS. 27, 28 and 30. A multi-slot delivery system 476 provides reactants, inert gases and radiation absorbing gases in desired quantities into plenum 472. Multi-slot delivery system 476 connects to appropriate sources through tubes 478. Mixing takes place within plenum 472 as the gases/vapor flow toward grid 466. Near the multi-slot delivery system within the plenum 472, turbulence agitation takes place as the adjacent flows meet. As the flow proceeds through plenum 472, the flow becomes quiescent with diffusional mixing taking place. The flow grid straightens the flow and homogenizes the flow across the length and width of the inlet. Generally, a flow grid would not be used for aerosol precursors since restriction of the flow due to the flow grid would result in undesirable amounts of aerosol condensation.

In some embodiments, the pressure drop ($p_1$) across the slots of multi-slot delivery system 476 is the largest pressure drop in the nozzle. The second largest pressure drop ($p_2$) is across flow grid 466. The pressure drop ($p_3$) along the length of the gas manifold leading to the slots of multi-slot delivery system 476 is less than $p_2$. The lowest pressure drop ($p_4$) within the reactant delivery portion of the reactant delivery nozzle is across the plenum 472. These pressure drops are indicated in FIG. 30.

The inclusion of a flow grid allows for the use of a more compact reactant delivery system while providing non-turbulent or nearly non-turbulent flow into the reaction chamber and into the reaction zone. Without the flow grid, the flow nozzle leading to the reaction chamber is designed with a length that is about 20 times the width to ensure non-turbulent flow. The flow grid reduces the hydraulic radius for the flow within the grid since the cross section of each path within the grid is much smaller than the overall cross section. The smaller dimensions of the grid reduce the hydraulic radius in an approximately linear fashion. Thus, the use of a flow grid is an alternative to having a large aspect ratio for maintaining non-turbulent flow. Generally, for some embodiments, the openings of the flow grid have dimensions in the range(s) from about 0.1 mm to about 10 mm, in other embodiments in the range(s) from about 0.5 mm to about 5 mm. A person of ordinary skill in the art will recognize that other ranges within these explicit ranges are contemplated and are within the present disclosure.

A slot nozzle can be used for delivering reactants and other gas/vapor compositions into the reaction chamber. The slot nozzle can deliver compositions directly into the chamber or indirectly through a mixing chamber and, optionally, a flow grid. A slot nozzle generally has adjustable slot sizes such that the flow from particular slots can be adjusted for a particular application. Thus, an adjustable slot nozzle is particularly useful for reaction chambers with multiple uses such that the reactant inlet nozzle can be adjusted for a particular use.

An embodiment of a slot nozzle with two slots is shown in FIG. 31. In slot nozzle 500, gas/vapor compositions flow into flow channels 502, 504, which connect, respectively, with slot inlets 506, 508. Flow channels 502, 504 connect with an appropriate delivery system for reactants, inert gases, laser absorbing gases and other suitable compositions for delivery. Slot outlets 506, 508 are formed by rails 510, 512, 514. Rails 510, 512, 514 function as flow restrictors to form a pressure drop across flow channels 502, 504 such that flow channels 502, 504 have relatively constant velocity along the entire channel and flow is approximately uniform along the length of slot outlets 506, 508.

A cross section of a slot nozzle with five slots is shown in FIG. 32. Slats 520, 522, 524, 526 form flow channels 528, 530, 532, 534, 536 between end walls 538, 540. Base plate 542 forms the lower boundary of the flow channels. Rails 550, 552, 554, 556, 558, 560 form slots 562, 564, 566, 568, 570. The dimensions of specific rails determine the sizes of a slot formed by the rails. The position of slats 520, 522, 524, 526 determines the dimensions of flow channels 528, 530, 532, 534, 536 and, along with the size of slots 562, 564, 566, 568, 570 determine the degree of pressure drop across the slots.

The slats can be welded onto base plate 542 to form a permanent configuration of the slot nozzle. In some embodiments, the configuration of the slot nozzle can be changed for particular applications. In the adjustable embodiments, the number of slots and corresponding structural elements, the position of the slats and the sizes of the rails can be changed to yield particular desired flow properties from the slot nozzle. The dimensions of the slots can be fixed by spacers 580, 582, 584, 586, 588 placed at the ends of rails 550, 552, 554, 556, 558, 560, as shown in FIG. 33. Spacers and rails can be removed or added to form the desired number of slots with appropriate adjustment in sizes of the elements used.

The structure can be held in place by tension applied through walls 538, 540. The structure can be stabilized through the addition of a bolt 590 and nut 592 secured through holes extending through walls, 538, 540, rails 550, 552, 554, 556, 558, 560 and through spacers. An equivalent nut and bolt would be used on the opposite end of the rails than shown in FIG. 33. Alternatively, an adhesive, such as epoxy, can be used to hold the structure together, and other fastening systems can also be used. A spacer 594 with a hole 596 for bolt 590 is shown in FIG. 34. Gaskets and the like can be used to inhibit flow between flow channels and slots within the slot nozzle.

Figure 35:
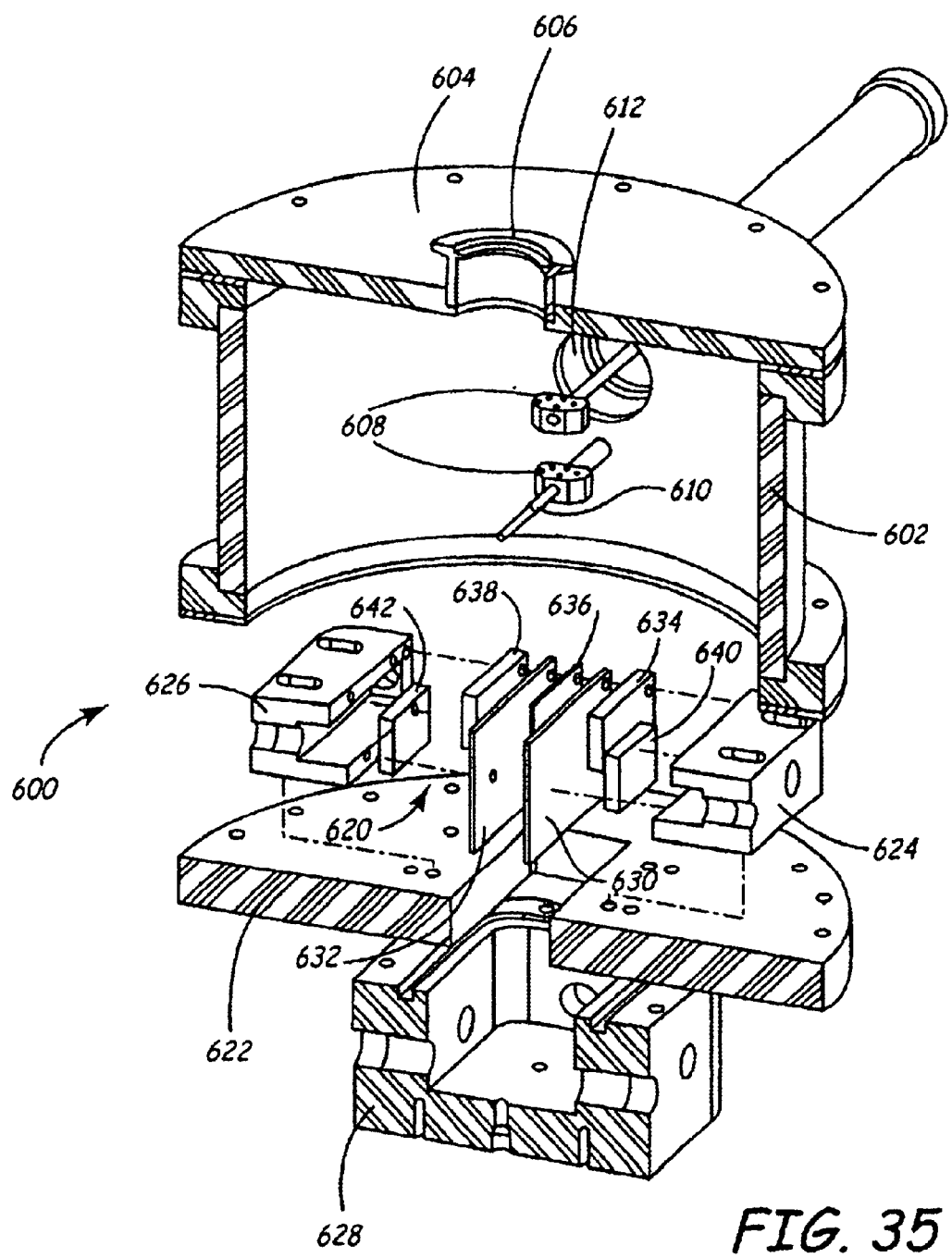
FIG. 35 is a fragmentary, exploded perspective view of a reaction chamber for substrate coating with a slot nozzle, in which half of the reaction chamber is removed to show the internal structure.

A particular embodiment of a slot nozzle in a reaction chamber for light reactive deposition is shown in a fragmentary, exploded view in FIG. 35. Reaction chamber 600 has a main chamber 602 with a top plate 604 comprising an exhaust outlet 606. A velocity probe arm 608 connects to a hot wire probe 610. Hot wire probe 610 can be used to measure flow velocity during operation of the chamber.

Slot nozzle 620 extends through base plate 622 forming the lower wall of main chamber 602. Braces 624, 626 hold slot nozzle 620 together. Slot nozzle 620 connects with the reactant delivery system at chamber 628. Chamber 628 can comprise slats or other components of a flow manifold to direct flow to the slots. Slot nozzle 620 comprises rails 630, 632, spacers 634, 636, 638 between walls 640, 642.

Figure 37:
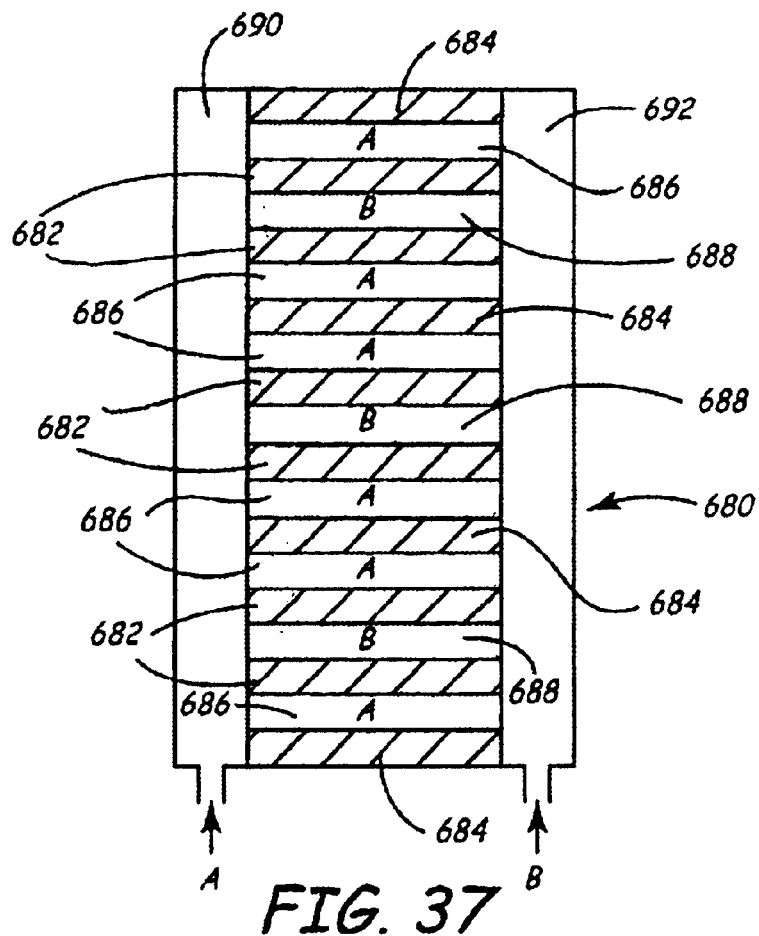
FIG. 37 is a top sectional view of the nozzle of FIG. 36 with the cross section taken through the nozzle to expose the manifolds directing reactants to the different slots of the nozzle.

An alternative embodiment of a slot nozzle is shown in FIGS. 36 and 37. In this embodiment, the slots are oriented perpendicular to the orientation of the slots in the embodiment shown in FIGS. 31–35. The embodiment in FIGS. 36 and 37 is particularly suitable for the delivery of reactants that spontaneously react so that they mix within the reaction chamber.

Referring to FIGS. 36 and 37, nozzle 680 comprises slot plates 682 that separate reactants A and B. Nozzle 680 can further comprise slot plates 684 that divide/direct the flow of a particular reactant. Flow channels for reactant A 686 are separate from flow channels for reactant B 688. Flow channels 686 connect to a first manifold 690 for the delivery of reactant A, and flow channels 688 connect to a second manifold 692 for the delivery of reactant B. Reactants A and B mix within reaction chamber 694 and flow into light reaction zone 696 where they react.

Figure 38:
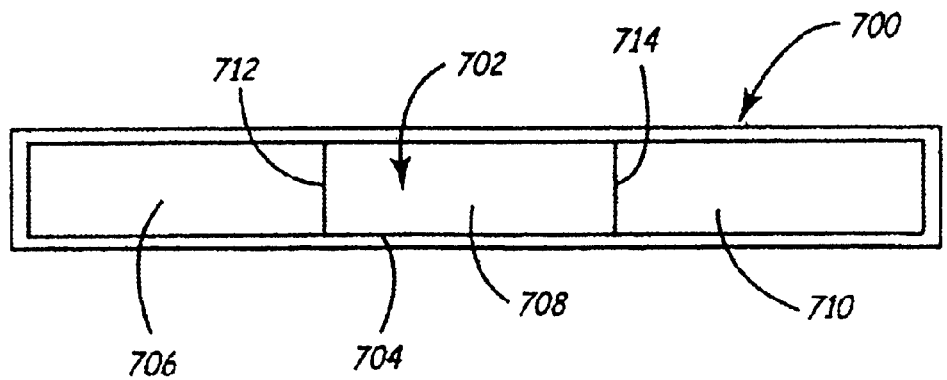
FIG. 38 is a top view of a nozzle with dividers that divide the elongated length of the nozzle.

Improved uniformity also can be achieved with an elongated nozzle that is compartmentalized to have separate inlet openings along the elongated length of the nozzle. The improved uniformity is especially advantageous for aerosol delivery. Referring to FIG. 38, nozzle 700 has a reactant delivery inlet 702 and a shielding gas inlet 704. Reactant delivery inlet 702 is elongated in one dimension relative to the orthogonal dimension. Shielding gas inlet 704 surrounds reactant delivery inlet 702.

Reactant delivery inlet 702 is divided into three separate inlet openings 706, 708, 710 with dividers 712, 714 separating the flow of adjacent openings. Each inlet opening 706, 708, 710 can be associated with a separate aerosol generator or a single aerosol generator can deliver aerosol to the three inlet openings. Generally, one or more vapor/gas sources also connected to inlet openings 706, 708, 710 for the delivery of additional reactants, reaction moderators, radiation absorbing gases and/or the like. While FIG. 38 shows three separate inlet openings, two separate inlet openings or four or more inlet openings can be used. Each separate inlet opening may or may not be elongated along the elongated dimension of the reactant delivery inlet.

As utilized herein, the term "in the range(s)" or "between" comprises the range defined by the values listed after the term "in the range(s)" or "between", as well as any and all subranges contained within such range, where each such subrange is defined as having as a first endpoint any value in such range, and as a second endpoint any value in such range that is greater than the first endpoint and that is in such range.

The embodiments above are intended to be illustrative and not limiting. Additional embodiments are within the claims. Although the present invention has been described with reference to specific embodiments, workers skilled in the art will recognize that changes may be made in form and detail without departing from the spirit and scope of the invention.

What is claimed is:

1. A reactor comprising a main chamber, a radiation source and a reactant source comprising a reactant inlet nozzle, the nozzle comprising and inlet slot opening into the main chamber elongated in one direction relative to an orthogonal direction thereof and an elongated throat baffle operably connected to the inlet slot that modulates a flow of ractants into the inlet slot, the radiation source being oriented to direct radiation through the main chamber to intersect with a reactant stream path from the reactant inlet nozzle.

2. The reactor of claim 1 wherein the main chamber comprises a cross section perpendicular to the flow direction from an opening of the reactant inlet that has an elongated dimension relative to the orthogonal direction, wherein the elongated dimension of the main chamber is aligned with the elongated dimension of the nozzle.

3. The reactor of claim 1 wherein the reactant source comprises a plurality of compositions that are in one or more containers operably connected to the nozzle for the delivery of the compositions into the nozzle.

4. The reactor of claim 3 wherein the one or more containers supply vapor to the nozzle.

5. The reactor of claim 3 wherein at least one of the compositions comprises a silicon precursor composition.

6. The reactor of claim 1 wherein the reactant source comprises an aerosol generator configured to deliver and aerosol to the main chamber through the reactant inlet nozzle.

7. The reactor of claim 1 wherein the length of opening of the inlet slot along the elongated direction is at least a factor of five larger than the orthogonal dimension of the opening.

8. The reactor of claim 1 further comprising a shielding gas opening operably connected to an inert gas source.

9. The reactor of claim 8 wherein the shielding gas opening is adjacent to the opening of the reactant inlet slot.

10. The reactor of claim 1 wherein the throat baffle comprises a projection inserted part way into the inlet slot.

11. The reactor of claim 1 wherein the throat baffle comprises a flat surface below the inlet slot.

12. The reactor of claim 1 wherein the throat baffle comprises a trough below the inlet slot.

13. The reactor of claim 1 wherein the radiation source comprises a light source and optical components.

14. The reactor of claim 13 wherein the light source comprises an infrared laser.

15. The reactor of claim 1 further comprising a coating surface within the main chamber.

16. The reactor of claim 15 wherein the coating surface is operably capable of moving relative to inlet slot opening.

17. The reactor of claim 16 wherein the length of the inlet slot opening along the elongated direction is larger than a dimension across the coating surface orthogonal to the direction of movement relative to the reactant inlet opening and wherein intersection of the radiation and the reactants results in a product stream path wherein the coating surface is operably capable of moving the entire coating surface through the product stream path.

18. The reactor of claim 17 wherein the coating surface has a dimension across the coating surface of at least about five inches.

19. The reactor of claim 18 wherein the radiation source is configured to direct radiation along the elongated direction of the reactant inlet nozzle.

20. A reactor comprising a main chamber, a radiation source and a reactant delivery system comprising a reactant inlet nozzle opening into the main chamber wherein the inlet nozzle comprises a group of at least three aligned elongated inlets opening into the main chamber and wherein the elongated inlets are connected to reactant supplies generating increasing reactant velocities emanating from successive inlets when proceeding from the center of the group of aligned inlets to outer inlets, the radiation source being oriented to direct radiation through the main chamber along an elongated direction of the inlet openings to intersect with a reactant stream path from the reactant inlet nozzle.

21. The reactor of claim 20 wherein each of the elongated inlets into the reaction chamber is elongated with a length along its respective dimension at least about a factor of five greater than an orthogonal dimension of the respective elongated inlet.

22. The reactor of claim 20 wherein the main chamber comprises side walls adjacent the surface with the reactant inlet nozzle, wherein the side walls are oriented along the elongated dimension of the reactant inlet nozzle opening, the side walls being angled inward toward each other in a direction orthogonal to the elongated direction reducing a dimension of the reaction chamber with increasing distance from the reactant delivery nozzle.

23. The reactor of claim 22 wherein the angled walls are planar.

24. The reactor of claim 22 wherein the angled walls are curved.

25. The reactor of claim 20 wherein the reactant inlet nozzle is operably connected to a vapor reactant source.

26. The reactor of claim 20 wherein the group of aligned inlets comprises at least five aligned elongated inlets.

27. The reactor of claim 20 wherein at least two elongated inlets symmetrically placed about the center of the group of elongated inlets are connected to both an inert gas source and a gas/vapor reactant source.

28. The reactor of claim 20 wherein at least one elongated inlet is operably connected to an aerosol generator.

29. The reactor of claim 28 wherein the at least one elongated inlet is further operably connected to a gas source wherein gas from the gas source entrains aerosol from the aerosol generator.

30. A reactor comprising a main chamber, a radiation source and a reactant delivery apparatus comprising a reactant inlet nozzle, wherein the reactant inlet nozzle comprises a plurality of inlets opening into the main chamber and a plurality of positionable slot plates separated by spacers to form desired slot dimension(s) and wherein the slot plates form the plurality of inlets, the radiation source being oriented to direct radiation through the main chamber to intersect with a reactant stream path from the reactant inlet nozzle.

31. The reactor of claim 30 wherein the plurality of slot plates comprises at least four slot plates.

32. The reactor of claim 30 wherein the plurality of slot plates are separated from each other with an air tight seal with a defined opening that leads between each pair of slot plates.

33. The reactor of claim 32 wherein at least one of the inlets is operably connected to a source of reactant precursor.

34. The reactor of claim 33 wherein the source of reactant precursor comprises a vapor precursor source.

35. The reactor of claim 33 wherein the source of reactant precursor comprises an aerosol generator.

36. The reactor of claim 32 wherein at least two of the inlets are operably connected to a source of inert gas.

37. The reactor of claim 30 wherein the slot plates are elongated in one dimension relative to orthogonal dimension thereof to form inlets with a length at least about five times larger than an orthogonal dimension of the inlets.

38. The reactor of claim 30 wherein the number of slot plates can be changed to alter the number of inlets.

39. A reactor comprising a main chamber, a radiation source and a reactant delivery apparatus comprising a reactant source that comprises a reactant inlet nozzle, the reactant inlet nozzle comprising an inlet opening into the main chamber elongated in one dimension relative to an orthogonal dimension thereof, the reactant inlet nozzle being tapered in the direction leading to the inlet opening to reduce a dimension of a flow path corresponding to the elongated direction of the inlet, the radiation source being oriented to direct radiation through the main chamber to intersect with a reactant stream path from the reactant inlet nozzle.

40. The reactor of claim 39 wherein the reactant inlet nozzle comprises wedge shaped projections projecting in a direction generally opposite a flow direction, the flow direction being toward the inlet opening, the wedge shaped projections comprising angled sides leading to the elongated dimension of the inlet.

41. The reactor of claim 40 wherein the wedge shaped projections are spaced away from a wall of the reactant inlet nozzle to form a baffle gap between the projection and the wall that does not connect to the inlet opening.

42. The reactor of claim 41 wherein the wedge shaped projections comprise a cross section parallel to the flow direction toward the inlet opening that is triangular.

43. The reactor of claim 42 wherein a side of the triangular cross section of the projections facing the nearest wall of the reactant inlet nozzle is roughly perpendicular to the wall of the reactant inlet nozzle.

44. The reactor of claim 41 wherein each of the projections comprises a curved face.

45. The reactor of claim 41 wherein each of the edges of the nozzle comprises a hyperbolic shaped edge along a cross section leading to the elongated edge of the inlet.

46. The reactor of claim 39 wherein the reactant source comprises an aerosol generator that directs aerosol toward the inlet opening.

47. The reactor of claim 46 wherein the reactant source comprises a vapor precursor source.

48. The reactor of claim 39 wherein the radiation source is oriented to direct radiation along the elongate direction of the nozzle.

49. A reactor comprising a main chamber, a radiation source and a reactant source comprising a reactant inlet nozzle that comprises a flow grid and a channel from a reactant precursor source to a reactant inlet opening into the main chamber, the flow grid being operably connected to the channel wherein the flow grid divides a flow at the reactant inlet opening into a plurality of divided flows, the radiation source being oriented to direct radiation through the main chamber to intersect with a reactant stream path from the reactant inlet nozzle.

50. The reactor of claim 49 wherein the reactant inlet is elongated in one dimension relative to an orthogonal direction thereof.

51. The reactor of claim 50 wherein the flow grid comprises slots on a rectangular grid.

52. The reactor of claim 49 further comprising a shielding gas channel leading to a shielding gas inlet, the shielding gas channel comprising a flow grid.

53. A reactor comprising a main chamber, a radiation source and a reactant source comprising a reactant inlet nozzle that comprises a channel leading to a reactant inlet that opens into the main chamber, the reactant inlet comprising structure that defines an elongated length and a width having an aspect ratio of at least about 50, the radiation source being oriented to direct radiation through the main chamber to intersect with a reactant stream path from the reactant inlet nozzle.

54. The reactor of claim 53 wherein the radiation source comprises a light source and optical components oriented to project light from the light source along a light beam path through the main chamber to intersect a reactant stream from the reactant inlet wherein the light beam path is oriented along a direction corresponding to the elongated dimension of the opening.

55. A reactor comprising a main chamber, a radiation source and a reactant source comprising a reactant inlet nozzle that comprises a channel leading to a reactant inlet that opens into the main chamber, the reactant inlet comprising structure that defines an opening with an elongated dimension and a width that varies along the elongated dimension in which the width is greater near the ends of the elongated dimension than at the center of the elongated dimension, the radiation source being oriented to direct radiation through the main chamber along the elongated direction of the opening to intersect with a reactant stream path from the reactant inlet nozzle.

56. The reactor of claim 55 wherein the shape of the reactant inlet provides approximately uniform mass flow along the elongated dimension of the reactant inlet.

57. A reactor comprising a main chamber, a radiation source and a reactant source comprising a reactant inlet that opens into the main chamber, the reactant inlet being elongated in one dimension relative to an orthogonal dimension thereof with the elongated dimension of the reactant inlet being at least about 5 centimeters and the reactant inlet generating a reactant stream with a velocity along the length of the inlet that at each position differs in magnitude from the average velocity by no more than about 50% of the average of the velocity of flows of the reactant stream, the radiation source being oriented to direct radiation through the main chamber along the elongated direction of the reactant to intersect with a reactant stream path from the reactant inlet.

58. The reactor of claim 57 wherein the average of the velocities is at least about 1 meter per second.

59. The reactor of claim 57 wherein the velocity along the length of the inlet at each position differs in magnitude from the average velocity by no more than about 35% of the average of the velocities.

60. A reactor comprising a main chamber, a radiation source and a reactant source comprising a reactant inlet that opens into the main chamber, the reactant source comprising an aerosol generator that generates an aerosol for delivery through the reactant inlet, the reactant inlet comprising an elongated dimension relative to an orthogonal dimension thereof and the reactant inlet comprising a plurality of openings separated along the elongated dimension of the inlet with a barrier separating each of the openings from an adjacent opening.

61. The reactor of claim 60 wherein the plurality of openings comprises at least three openings.

62. The reactor of claim 60 wherein each opening is itself elongated along the elongated dimension of the inlet.

63. The reactor of claim 60 wherein the reactant source comprises a reactant vapor precursor source.

* * * * *